US008482566B2

(12) United States Patent
Ito

(10) Patent No.: US 8,482,566 B2
(45) Date of Patent: Jul. 9, 2013

(54) ELECTRONIC PAPER TERMINAL DEVICE; COMPUTER-READABLE MEDIUM STORING IMAGE DISPLAY CONTROL PROGRAM, AND IMAGE DISPLAY CONTROL METHOD

(75) Inventor: Yoshinori Ito, Inagi (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 12/929,705

(22) Filed: Feb. 9, 2011

(65) Prior Publication Data

US 2011/0141119 A1   Jun. 16, 2011

Related U.S. Application Data

(63) Continuation of application No. PCT/JP2008/064459, filed on Aug. 12, 2008.

(51) Int. Cl.
*G06T 11/20* (2006.01)
*G09G 5/00* (2006.01)

(52) U.S. Cl.
USPC .......................................... 345/441; 345/619

(58) Field of Classification Search
USPC ........................................................ 345/441
See application file for complete search history.

(56) References Cited

U.S. PATENT DOCUMENTS

| 5,101,440 | A  | * | 3/1992  | Watanabe et al. | 382/168 |
| 5,377,023 | A  | * | 12/1994 | Sano et al.     | 358/500 |
| 6,483,519 | B1 | * | 11/2002 | Long et al.     | 345/619 |
| 6,731,792 | B1 | * | 5/2004  | Tanaka          | 382/164 |
| 7,515,126 | B2 | * | 4/2009  | Senda et al.    | 345/77  |
| 7,586,484 | B2 | * | 9/2009  | Sampsell et al. | 345/204 |
| 2003/0016221 | A1 | * | 1/2003 | Long et al.    | 345/441 |
| 2006/0001595 | A1 | * | 1/2006 | Aoki           | 345/1.2 |
| 2006/0132426 | A1 | * | 6/2006 | Johnson        | 345/107 |
| 2007/0200839 | A1 | * | 8/2007 | Sampsell       | 345/204 |
| 2008/0068402 | A1 | * | 3/2008 | Ioka et al.    | 345/660 |
| 2009/0027419 | A1 | * | 1/2009 | Kondo et al.   | 345/649 |
| 2009/0153546 | A1 | * | 6/2009 | Senda et al.   | 345/214 |

FOREIGN PATENT DOCUMENTS

| JP | 01-092063   | 4/1989  |
| JP | 11-296157   | 10/1999 |
| JP | 2000-305069 | 11/2000 |
| JP | 2005-77634  | 3/2005  |
| JP | 2005-077634 | 3/2005  |

OTHER PUBLICATIONS

Japanese Office Action mailed Jul. 24, 2012 issued in corresponding Japanese Patent Application No. 2010-524636.
Patent Abstracts of Japan, Publication No. 11-296157, published Oct. 29, 1999.
Patent Abstracts of Japan, Publication No. 2000-305069, published Nov. 2, 2000.
Patent Abstracts of Japan, Publication No. 01-092063, published Apr. 11, 1989.
Patent Abstracts of Japan, Publication No. 2005-77634, published Mar. 24, 2005.

* cited by examiner

*Primary Examiner* — M Good Johnson
(74) *Attorney, Agent, or Firm* — Staas & Halsey LLP

(57) ABSTRACT

In an electronic paper terminal device, a drawing order determination unit analyzes an image to be displayed, and determines priority of each line. A priority storage unit stores the priority of each line determined by the drawing order determination unit. A drawing unit selects lines in descending order of the priority stored in the priority storage unit, acquires image data on the selected lines from the image to be displayed, and draws on the selected lines of a display device on the basis of the acquired image data.

19 Claims, 20 Drawing Sheets

FIG. 1

123d UPDATE RANGE STORAGE UNIT

123da UPDATE RANGE TABLE

| AREA NUMBER | TOP LEFT COORDINATE | BOTTOM RIGHT COORDINATE |
|---|---|---|
| #1 | (100,10) | (200,60) |
| #2 | (10,100) | (700,101) |
| #3 | (80,400) | (659,560) |
| #4 | (5,6) | (100,20) |
| #5 | (170,44) | (190,250) |
| ⋮ | ⋮ | ⋮ |

FIG. 9

123n PRIORITY STORAGE UNIT

123na PRIORITY TABLE

| DIRECTION | LINE NUMBER | PRIORITY |
|---|---|---|
| HORIZONTAL | 0 | (priority#1) |
| HORIZONTAL | 1 | (priority#2) |
| HORIZONTAL | 2 | (priority#3) |
| ⋮ | ⋮ | ⋮ |
| HORIZONTAL | 1023 | (priority#1024) |
| VERTICAL | 0 | (priority#1025) |
| VERTICAL | 1 | (priority#1026) |
| VERTICAL | 2 | (priority#1027) |
| ⋮ | ⋮ | ⋮ |
| VERTICAL | 767 | (priority#1792) |

FIG. 17

ELECTRONIC PAPER TERMINAL DEVICE; COMPUTER-READABLE MEDIUM STORING IMAGE DISPLAY CONTROL PROGRAM, AND IMAGE DISPLAY CONTROL METHOD

This application is a continuing application, filed under 35 U.S.C. §111(a), of International Application PCT/JP2008/064459, filed on Aug. 12, 2008.

FIELD

The embodiment discussed herein is related to an electronic paper terminal device which displays an image on a display device, a computer-readable medium storing an image display control program, and an image display control method.

BACKGROUND

When a screen is updated by using a computer, scanning for an image display is performed in sequence from the top or bottom side or from the right or left side. As a result, an image is displayed scanning line by scanning line. In a computer used for common usage, an image update is performed a few dozen times for one second. The number of times of the image update for one second is referred to as a refresh rate. For example, when the refresh rate is 60 Hz, the image update is performed sixty times for one second.

As described above, when changeful images are displayed in real time on a display device which performs the image update a few dozen times for one second, an image is drawn at the same speed as that of the image update of the display device. Note that a time necessary for drawing an image of one screen is different depending on the number of displayed graphics. In other words, an image including a plurality of detailed graphics is drawn at a slow speed. If the drawing is not in time in an animation display, a drawing processing of a part of a graphic is cancelled, thereby performing real time display (Japanese Laid-open Patent Publication No. 11-296157).

Incidentally, as one computer control apparatus equipped with a display device, an electronic paper terminal device is used. In the electronic paper terminal device, a display technology using, for example, a cholesteric liquid crystal is used. The display technology using a cholesteric liquid crystal used in the above-described electronic paper terminal device has the advantage of being able to keep display contents even if the supply of power is cut off. Further, in a conventional electronic paper terminal device, sentences of books are intended to be read by using an electronic medium. For the purpose, a display image need not be updated in a frequency of a few dozen times for one second. In the electronic paper terminal device, the image update is performed, not at predetermined intervals, but when image data to be displayed is changed.

FIG. 20 illustrates a situation of an image update according to the conventional electronic paper terminal device. In an example of FIG. 20, there is illustrated a case of updating the display image from a state of displaying image data 91 including a graphic indicating a house to a state of displaying image data 92 including graphics indicating the house and a tree.

A first state (ST91) illustrates a screen 93 before an update. On this screen 93, only a graphic indicating the house is displayed. A second state (ST92) illustrates the screen 93 immediately after inputting an instruction of the screen update. When the instruction of the screen update is input, all the images displayed on the screen 93 are deleted. A third state (ST93) illustrates the screen 93 immediately after starting drawing the image on the basis of the image data 92. In this example, the image is displayed in sequence from the left side of the screen 93. A fourth state (ST94) illustrates the screen 93 on which a half of the images is displayed. At this moment, the drawing operation of a graphic of the newly-added tree is started. A fifth state (ST95) illustrates a state in which an image drawing is further advanced. A sixth state (ST96) illustrates a state after an update completion of the display image.

In an example of FIG. 20, the image is displayed in sequence from the left side to the right side, and on the contrary, the image may be displayed in sequence from the right side to the left side. Further, the image may be displayed downwards from the top side, or upwards from the bottom side.

As described above, in the electronic paper terminal device, when image data to be displayed is changed, the update of the display image is performed in sequence from the top or bottom side, or left or right side.

However, in the display technology used in the electronic paper terminal device, even if power is not supplied, an image can be kept, and on the other hand, a screen update speed is slow. Therefore, when the image is updated, a long time is necessary for grasping the whole image of the updated screen. When the electronic paper terminal device is specialized for reading a series of sentences as in a novel, a screen is displayed in sequence from the leading direction of sentences, thereby eliminating inconvenience for a user due to a delay of the screen update. Note that along with use expansion of the electronic paper terminal device, various contents need to be displayed. As a result, convenience of the electronic paper terminal device is impaired due to a delay of the screen update. As a multipurpose tool, the conventional electronic paper terminal device is not satisfactory for users in terms of operability.

SUMMARY

According to one aspect of the present invention, there is provided an electronic paper terminal device which includes: an image storage unit which stores an image to be displayed; a drawing order determination unit which analyzes the image to be displayed and determines priority of each of the lines of a display device capable of dividing a screen into a plurality of lines and drawing the image line by line; a priority storage unit which stores the priority of each line determined by the drawing order determination unit; and a drawing unit which selects the lines in descending order of the priority stored in the priority storage unit, acquires image data on the selected lines from the image to be displayed, and draws on the selected lines of the display device on the basis of the acquired image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example data structure of an update range storage unit;

FIG. 17 illustrates an example data structure of a priority storage unit;

DESCRIPTION OF EMBODIMENTS

Figure 1:
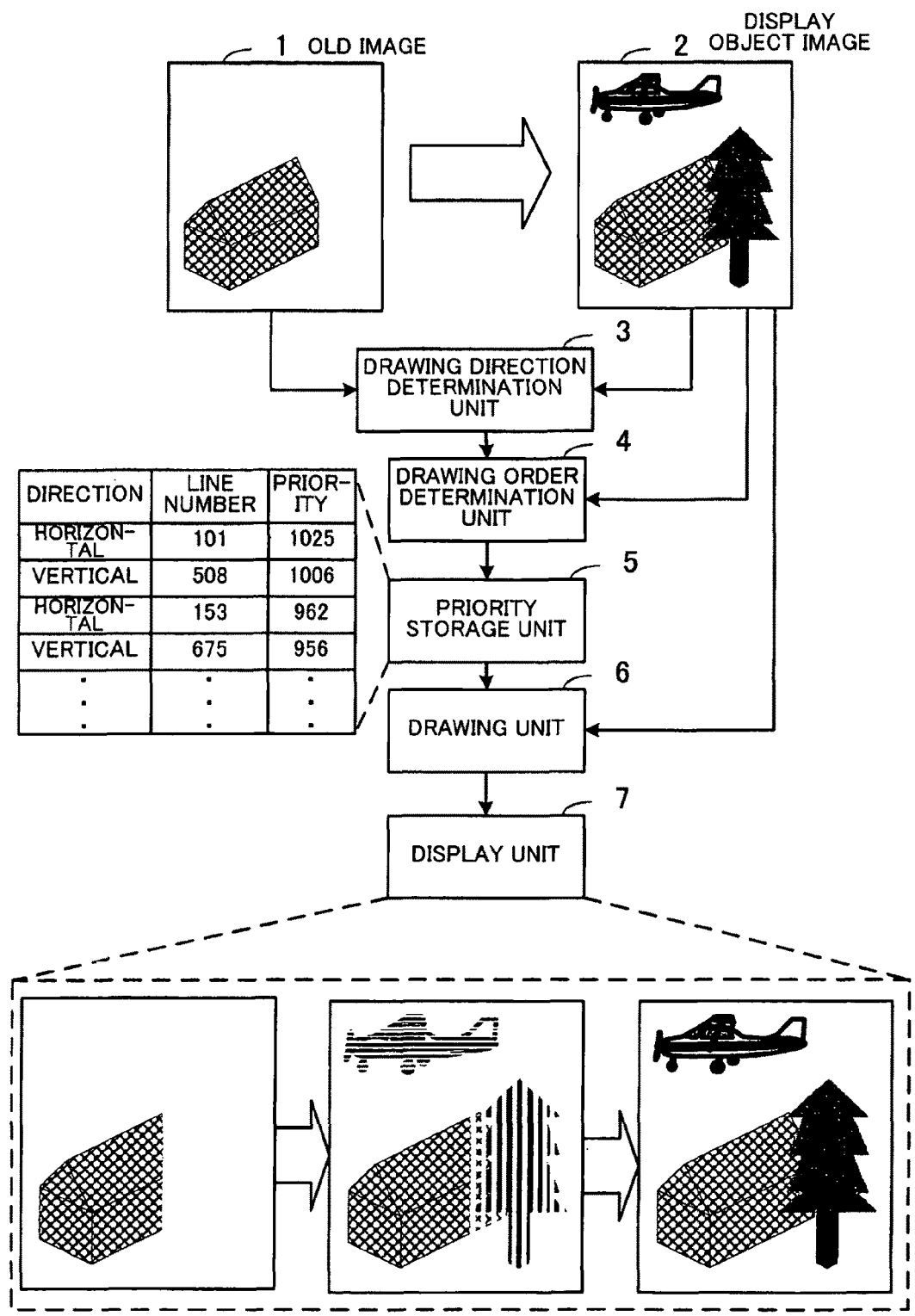
FIG. 1 illustrates an outline according to an embodiment.

A preferred embodiment of the present invention will now be described in detail below with reference to the accompanying drawings, wherein like reference numerals refer to like elements throughout.

FIG. 1 illustrates an outline according to the present embodiment. An electronic paper terminal device has a display device 7 capable of dividing a screen into a plurality of lines and drawing an image line by line. For causing this display device 7 to display an image 2 to be displayed, a drawing direction determination unit 3, a drawing order determination unit 4, a priority storage unit 5, and a drawing unit 6 are provided on the electronic paper terminal device.

The drawing direction determination unit 3 determines a different portion between an old image 1 before a change and the image 2 to be displayed, and takes the different portion from the image 2 to be displayed as an update range to be redrawn. Further, the drawing direction determination unit 3 compares the number of horizontal lines lying across the update range with the number of vertical lines lying across the update range, and determines a direction with the small number of lines as a drawing direction of the update range.

A drawing order determination unit 4 analyzes the image 2 to be displayed and determines the priority of each line. For example, the drawing order determination unit 4 determines the priorities of a plurality of respective lines in which a plurality of horizontal lines aligned in the vertical direction and a plurality of vertical lines aligned in the horizontal direction are mixedly present. In that case, in the individual update range, the drawing order determination unit 4 determines the priorities of the respective lines in the case of drawing the image on the lines of a direction determined by the drawing direction determination unit 3.

The priority storage unit 5 stores the priorities of the respective lines determined by the drawing order determination unit 4.

The drawing unit 6 selects lines in descending order of the priorities stored in the priority storage unit 5. Further, the drawing unit 6 acquires image data on the lines selected from the image 2 to be displayed and draws the image on the selected lines, of a display device on the basis of the acquired image data.

As a method for determining the priorities, the drawing order determination unit 4 gives higher priority, for example, to lines including the number of pixels with high concentration. In this case, the drawing order determination unit 4 can preferentially display lines to which a character string of characters with a deep color belongs. Further, the drawing order determination unit 4 gives higher priority to lines including the number of pixels with a large concentration difference with respect to adjacent pixels. In this case, the drawing order determination unit 4 makes it possible to previously display an outline of an object and rapidly grasp a shape of the displayed object. Further, the drawing order determination unit 4 makes it possible to compare concentration differences of respective pixels between the old image 1 and the image 2 to be displayed and give higher priority to lines including the number of pixels with large concentration differences. In this case, the drawing order determination unit 4 makes it possible to preferentially display an object in which a large change is performed, and rapidly grasp contents changed from the old image 1.

The electronic paper terminal device with the above-described functions draws the image so as to rapidly grasp contents of the image 2 to be displayed.

In an example of FIG. 1, for example, an update is performed from the old image 1 including only an object of a house to the image 2 to be displayed to which objects of a tree and an airplane are added. In this case, since an update range is vertically long about the object of the tree, the drawing direction determination unit 3 determines to draw the image on lines (vertical lines) in the vertical direction. On the other hand, since an update range is horizontally long about the object of the airplane, the drawing direction determination unit 3 determines to draw the image on lines (horizontal lines) in the horizontal direction.

As a result, the drawing order determination unit 4 determines the priorities of the vertical lines including the object of the tree and the horizontal lines including that of the airplane. Then, the drawing order determination unit 4 stores the determined priorities in the priority storage unit 5.

Next, the drawing unit 6 draws the image on the lines including the update range with respect to the display device 7 in descending order of the priorities. For example, the drawing unit 6 first deletes the image on the lines in the drawing direction including the update range. Next, the drawing unit 6 acquires the image data of the image 2 to be displayed in descending order of the priorities of the lines, and draws the image on the lines of the display device 7 on the basis of the acquired image data. As a result, the presence of the objects of the tree and the airplane can be recognized in the middle of the drawing operation.

As can be seen from the above sequence, even if using the display device with a slow drawing speed, this process permits the updated images to be rapidly grasped.

Hereinafter, the present embodiment will be specifically described.

Figure 2:
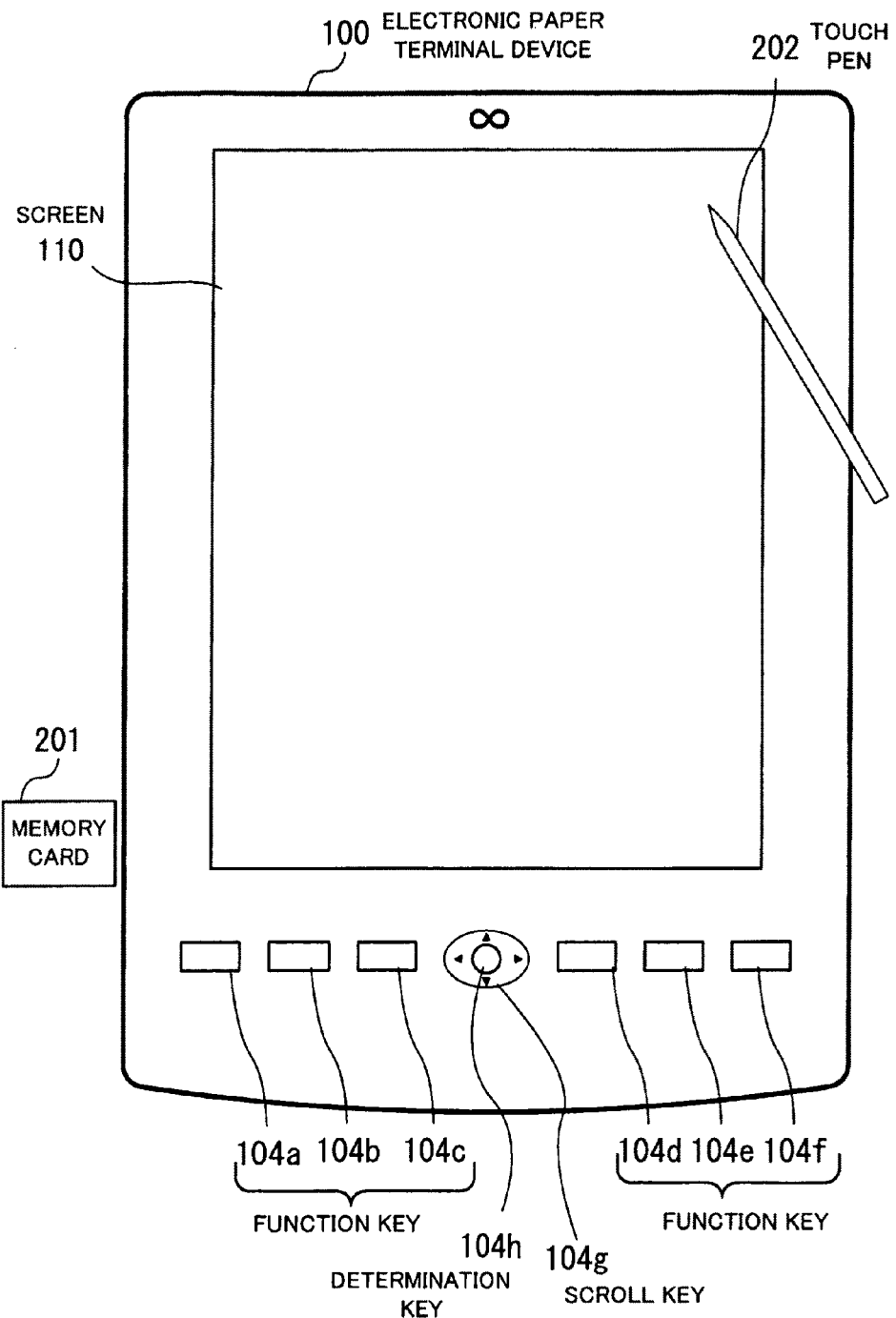
FIG. 2 is an external view illustrating an electronic paper terminal device.

FIG. 2 is an external view illustrating the electronic paper terminal device. On the electronic paper terminal device 100, there are provided a screen 110 of the display device using a cholesteric liquid crystal and a number of keys. The screen 110 includes a touch panel, and when contacting the screen 110 by using a touch pen 202, a user can perform an operation input such as a button selection mode.

The key includes a plurality of function keys 104a to 104f, a scroll key 104g, and a decision key 104h. To each of the function keys 104a to 104f, an application program is previously allocated. When the user presses down any one of the function keys 104a to 104f, the application program corresponding to the pressed down function key is executed by the electronic paper terminal device 100.

The scroll key 104g is used for scrolling a screen 110. The user can press down the scroll key 104g for scroll up, down, right, and left, i.e., four directions, and an image on the screen 110 is scrolled in the pressing down direction. Further, the scroll key 104g is used also for switching over a selection item on the screen 110. Specifically, when the user presses down the scroll key 104g in any one of the directions of up, down, right, and left, an object to be selected is transited to another adjacent item in the pressing down direction from the item under the selection. For example, when the user presses down a lower side of the scroll key 104g, the object to be selected is transited to the next item of the side lower than the item under the selection.

The decision key 104h is used for determining, as an object to be performed, the item under the selection displayed on the screen 110. When the decision key 104h is pressed down, a function corresponding to the item selected on the screen 110 is executed.

In addition, into the electronic paper terminal device 100, a memory card 201 can be inserted. When the user causes the memory card 201 to store various contents and inserts the memory card 201 into the electronic paper terminal device 100, its contents can be displayed on the screen 110 of the electronic paper terminal device 100.

Figure 3:
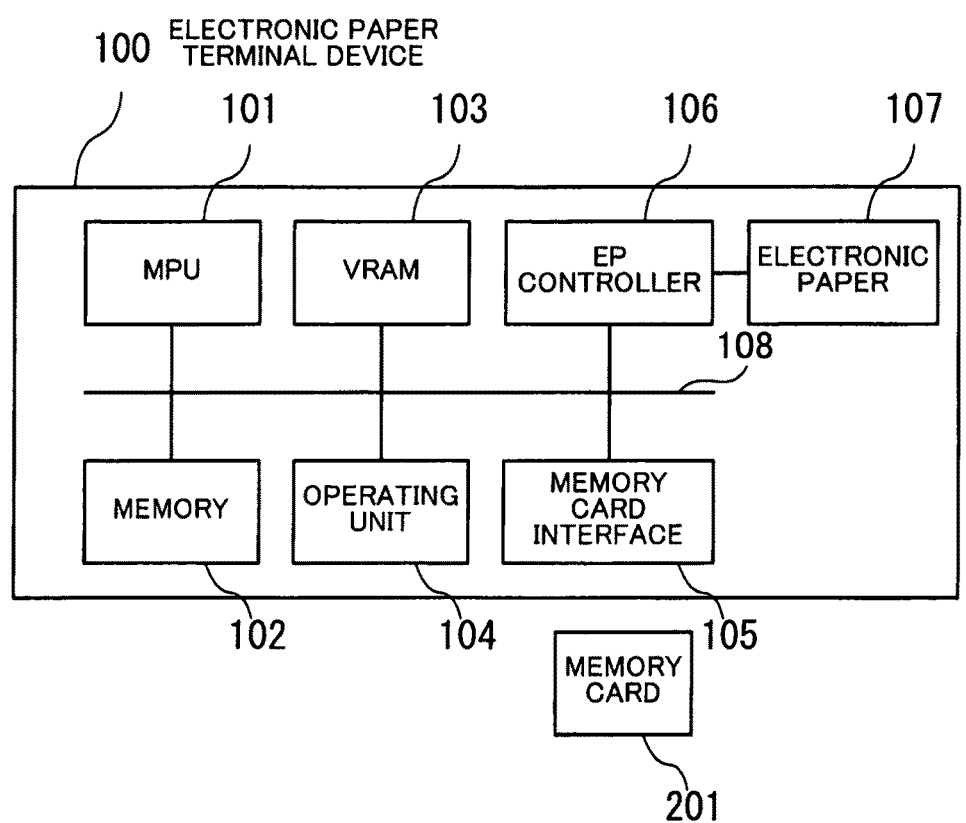
FIG. 3 illustrates an example hardware structure of the electronic paper terminal device.

FIG. 3 illustrates a hardware structure example of the electronic paper terminal device. The whole electronic paper terminal device 100 is controlled by an MPU (micro processing unit) 101. To the MPU 101, there are connected via a bus 108 a memory 102, a VRAM (video random access memory) 103, an operating portion 104, a memory card interface 105, and an EP (electronic paper) controller 106.

The memory 102 is used as a main storage unit of the electronic paper terminal device 100. In the memory 102, at least a part of an OS (operating system) program or application program executed by the MPU 101 is temporarily stored. In addition, in the memory 102, various data necessary for processes executed by the MPU 101 is stored. In the VRAM 103, an image to be displayed is stored. The operating portion 104 has various keys such as the function keys 104a to 104f and transfers a signal corresponding to the pressed down key to the MPU 101. The memory card interface 105 exchanges data with respect to the inserted memory card 201.

To the EP controller 106, an electronic paper 107 is connected. The electronic paper 107 is a display device using a cholesteric liquid crystal. According to the instruction from the MPU 101, the EP controller 106 controls the drawing and deletion of images to the electronic paper 107.

The above-described hardware structure permits the electronic paper terminal device 100 to display an image and switch the displayed image to another, while responding to an operating input from the user. Note that operations of the electronic paper terminal device 100 are executed on the basis of programs stored in the memory 102.

Figure 4:
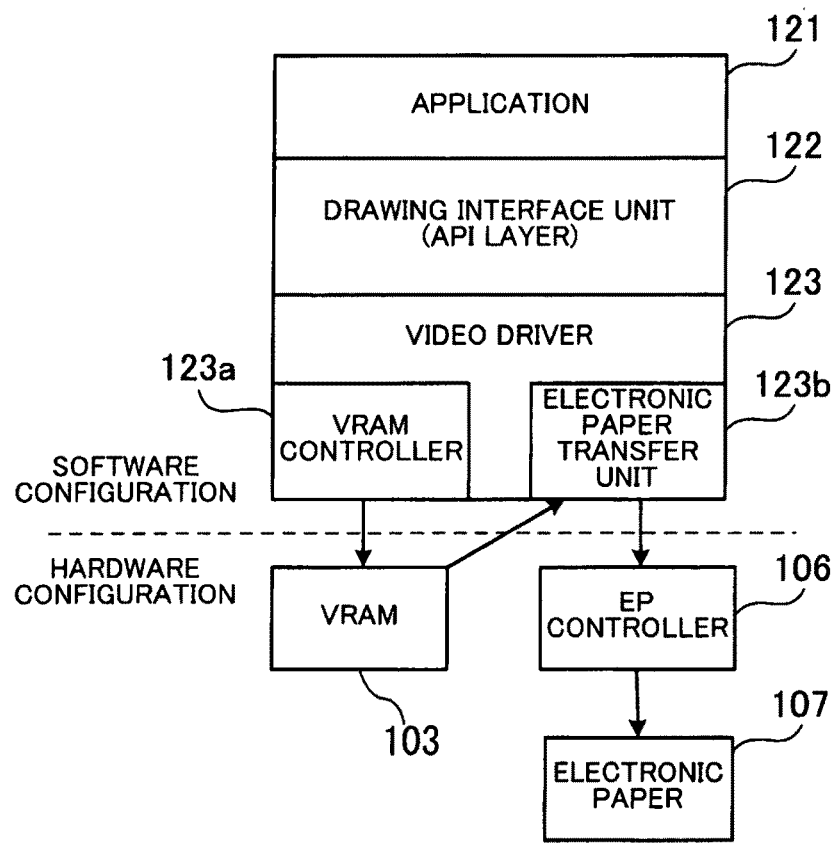
FIG. 4 illustrates an example software structure of the electronic paper terminal device.

FIG. 4 illustrates a software structure example of the electronic paper terminal device 100. In FIG. 4, there is illustrated only the software structure on the functions of displaying and updating an image.

The application 121 instructs a video driver 123 to generate an image via a drawing interface unit 122. The drawing interface unit 122 includes an API (application programming interface) layer and executes a function of processing the image. When calling a previously-prepared function of processing the image and setting a predetermined parameter for the function, the application 121 can instruct the video driver 123 to generate the image. The drawing interface unit 122 transfers the image generation instruction to the video driver 123 by using a program corresponding to the called function.

The video driver 123 generates the image according to the image generation instruction and instructs the EP controller 106 to draw the image on respective lines in the vertical or horizontal direction of the generated image. Concretely, the video driver 123 prepares a graphic according to the instruction from the application 121. Then, a VRAM controller 123a of the video driver 123 writes the prepared graphic in the VRAM 103. When the VRAM controller 123a finishes writing the graphic of one screen in the VRAM 103, an electronic paper transfer unit 123b of the video driver 123 reads image data from the VRAM 103 by one line in descending order of the priorities of the respective lines, and transfers the read image data to the EP controller 106.

The EP controller 106 displays the image on one line on the electronic paper 107 whenever receiving image data on one line from the video driver 123.

The above-described configuration makes it possible to calculate the priorities of respective lines of the screen 110 and draw the image in descending order of the priorities. In the present embodiment, the electronic paper terminal device 100 calculates the priorities of respective lines in the vertical and horizontal directions of the screen, and draws the image on the lines in descending order of the priorities. As a method for calculating the priorities (priority calculation method), a pixel concentration method, an adjacent pixel comparison method, and a new and old pixel comparison method are considered.

Figure 5:
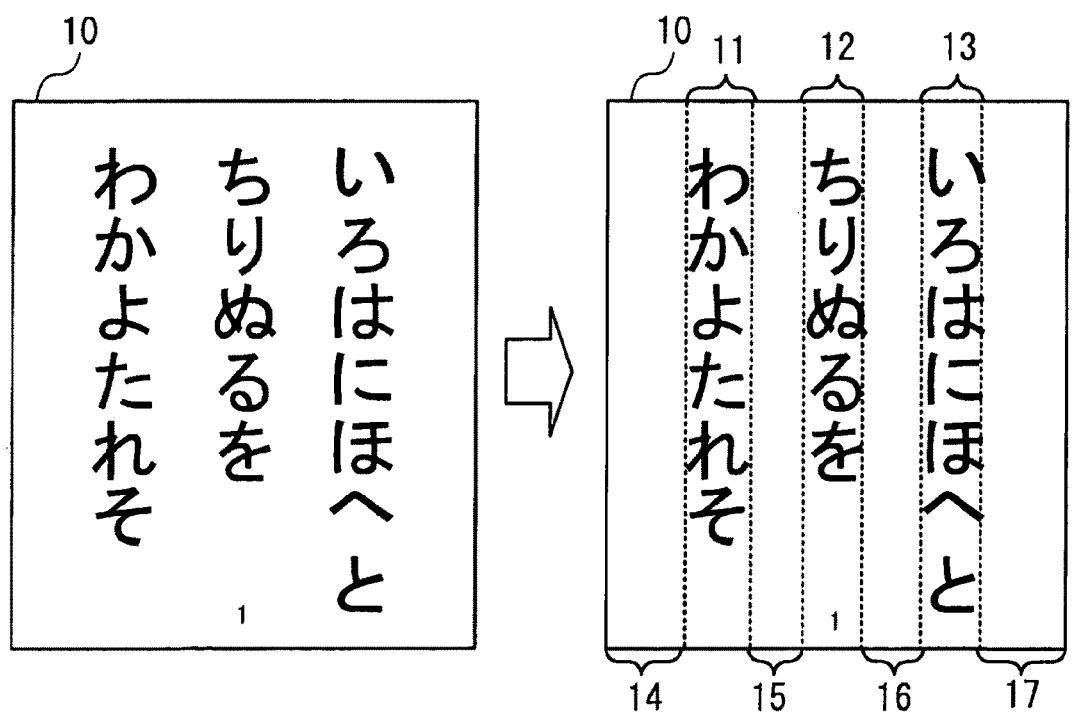
FIG. 5 illustrates a pixel concentration method.

FIG. 5 illustrates the pixel concentration method. The pixel concentration method includes calculating the concentration total of the respective lines of a drawing area and drawing the image on the lines in descending order of the concentration total. On this occasion, the drawing operation is omitted on the line of the concentration total of zero.

In an example of FIG. 5, a sentence of vertical writing is represented in the image 10. In the case of the vertical writing, the image 10 includes the row parts 11 to 13 in which characters of a sentence are represented, the blank parts 14 and 17, and the spacing parts 15 and 16. When a total of the pixels is calculated on respective vertical lines, each value of the row parts 11 to 13 is a value higher than each value of the blank parts 14 and 17, and that of the spacing parts 15 and 16. As a result, the priorities of the row parts 11 to 13 become higher. Further, the concentration of the blank parts 14 and 17, and that of the spacing parts 15 and 16 are equal to zero, respectively, and they are out of the object to be drawn. In this example, the drawing operation of the sentence is completed in about half the time of the case where the whole image 10 is drawn.

In addition, in the image 10, a page number is displayed in the row part 12. For example, when displayed in the bottom right of the image 10, the page number is displayed in the blank part 17. As a result, in several vertical lines on which the page number in the blank part 17 is displayed, the concentration total of pixels is not equal to zero. However, the concentration total of the relevant vertical lines has a value lower than that of respective lines of the row parts 11 to 13. Accordingly, the priorities of the lines on which the page number is displayed are lowered, and as a result, the lines in which the characters are included are preferentially displayed.

Figure 6:
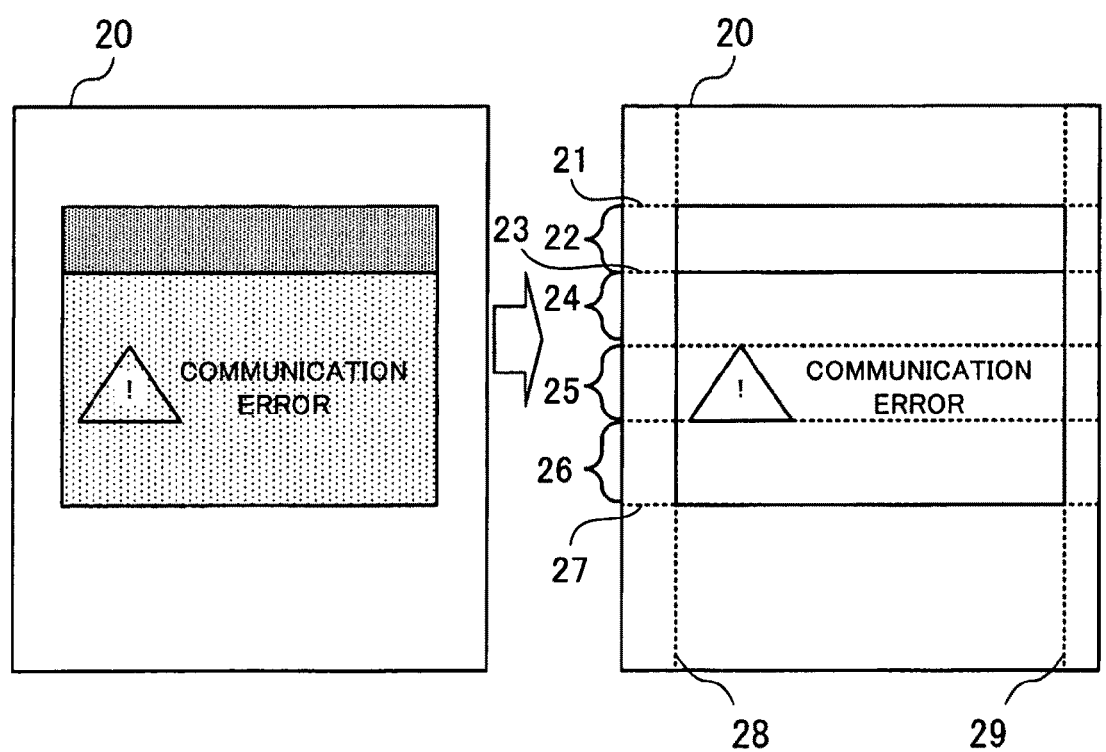
FIG. 6 illustrates an adjacent pixel comparison method.

FIG. 6 illustrates the adjacent pixel comparison method. In the adjacent pixel comparison method, color differences of respective pixels with respect to adjacent pixels of the top right, top left, bottom right, and bottom left sides are found out. The color differences of the respective pixels are totalized in respective lines, and an image is drawn from the line in which the color difference is largest. Pixels with large color differences with respect to the adjacent pixels appear in a portion with high contrast. In the adjacent pixel comparison method, the image is preferentially drawn from a portion with high contrast, and the whole feature can be instantaneously grasped.

In FIG. 6, the image 20 in which an error message is surrounded by a frame is illustrated. In the image 20, in portions 21, 23, 27, 28, and 29 including lines of the frame, a total of the color differences with respect to the adjacent pixels becomes large. In addition, since the frame in the image 20 is horizontally long, the portions 21, 23, and 27 configured by horizontal lines along the upper and lower sides of the frame become larger than the portions 28 and 29 configured by vertical lines along the right and left sides of the frame in the total of the color differences with respect to the adjacent pixels.

Further, the portion 25 on which characters and graphic in the frame are displayed becomes larger than the portions 22, 24, and 26 except the portion 25 in the frame in the total of the color differences with respect to the adjacent pixels.

First, on the lines belonging to the portions 21, 23, and 27 including the upper and lower sides of the frame, the image is drawn. Next, on the lines belonging to the portions 28 and 29 including the right and left sides of the frame, the image is drawn. Next, on the lines belonging to the portion 25 including the characters and graphic in the frame, the image is drawn and the characters and the graphic are displayed. Finally, on the lines belonging to the portions 22, 24, and 26 left in the frame, the image is drawn and a space in the frame is painted out.

In this example, the drawing operation of a remark part (frame, and characters and graphic in the frame) is completed in about one fourth the time of the case of drawing the whole image.

Figure 7:
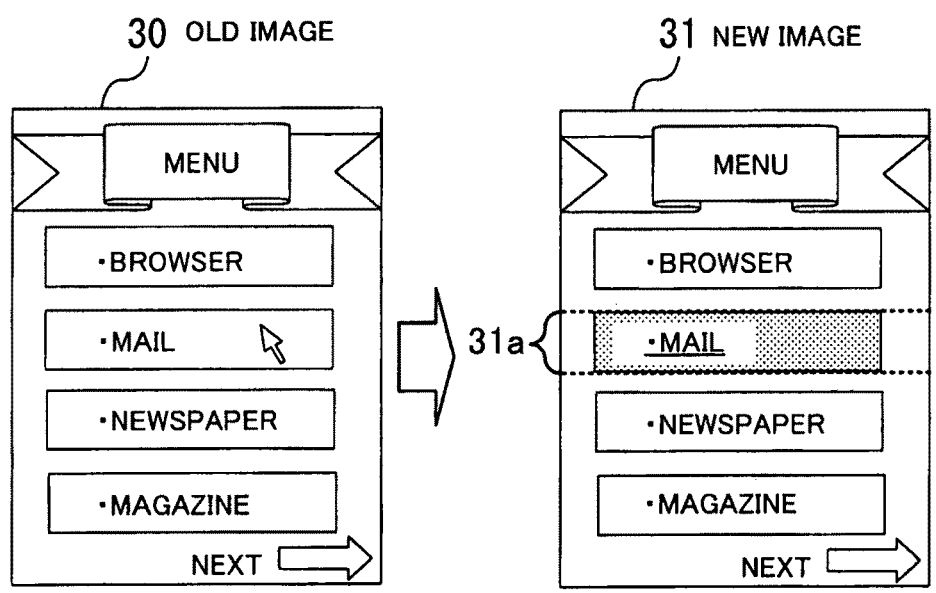
FIG. 7 illustrates a new and old pixel comparison method.

FIG. 7 illustrates the new and old pixel comparison method. In the new and old pixel comparison method, there are two buffers of an old image and a new image, and color differences between new pixels and old pixels are found out. The color differences of respective pixels are totalized in the respective lines, and an image is drawn on the lines in descending order of the color differences. In the above-described new and old pixel comparison method, since the image is drawn from the line with a large change from the old image, a rough feature of a change part can be instantaneously grasped.

In FIG. 7, there is illustrated an example in which when a button of a mail is selected, the old image 30 indicating a menu is transited to the new image 31 in which the button of the mail is highlighted. In this case, only a portion 31a including the button of the mail causes the color differences of the pixels when comparing the old image 30 and the new image 31. Consequently, the image is drawn on the lines configuring the relevant portion 31a. When the other portions are left without deleting contents of the old image 30, the image need not be redrawn. As a result, in this example, the drawing operation for highlighting the selected button can be completed in about one sixth the time of the case of drawing the whole image.

The priorities of respective lines in the vertical and horizontal directions can be calculated by any of the above-described priority calculation method. Then, an image is drawn on the lines in descending order of the priorities. When calculating the priorities, a method for selecting any one of the priority calculation methods and calculating the priorities and a method for combining a plurality of the priority calculation methods and calculating the priorities are considered. When selecting any one of the priority calculation methods, three methods can be used as follows as a selection method.

As a first selection method, a method for selecting a drawing method on the basis of an instruction from the application is used. In the application, a type of display data is previously limited and what-like display method is desired is found out in many cases. For the purpose of specifying an optimum display method in the above-described case, the video driver 123 has a function of receiving an instruction of the display method from the application.

As a second selection method, a method for selecting the priority calculation method according to an API call ratio of the application is used. In a recent device with a display, in general, the application does not directly control the VRAM 103 but draws an image via an API prepared by an OS. In these APIs, the drawing APIs such as a straight line, rectangle, polygon, bitmap transfer, character, and 3D object are prepared. The video driver 123 selects the optimum display method on the basis of the call ratio (rate of an individual API call to the number of times of call of the whole API call) of this API call (function). For example, when the total ratio of the drawing API such as a straight line, a rectangle, a character string is 50% or more, an image with high contrast such as characters is determined and the priorities are calculated by using the pixel concentration calculation method. Further, when the total ratio of the drawing API such as the 3D object is 50% or more, since the possibility that an image with gradations is drawn is high, the priorities are calculated by using the adjacent pixel comparison method.

As a third selection method, a method for selecting the priority calculation method according to a redrawing area ratio is used. The video driver 123 records an area in which a rewriting operation is performed from the previous screen, and selects the optimum drawing method according to the ratio of the area in which the rewriting operation is performed with respect to the whole screen. For example, when the redrawing area ratio is less than 30%, since a largely-changed portion is preferentially drawn, the priorities are calculated by using the new and old pixel comparison method. Further, in the case where the redrawing area ratio is 50% or more, since half or more of the areas are rewritten, the priorities are calculated by using the pixel concentration comparison method.

As can be seen from the above sequence, one of the priority calculation methods can be selected to calculate the priorities of the respective lines according to the instruction from the application or contents of the image. On the other hand, the plurality of priority calculation methods can be combined to calculate the priorities of the respective lines. In that case, when weights according to contents of the displayed image are set to the respective priority calculation methods, the appropriate priorities can be calculated according to contents of the image. For example, when the rewriting area is large, weights of the priorities calculated by using the respective concentration calculation method and adjacent pixel comparison method are increased. Further, when ratios of the character string drawing API and the rectangle drawing API are high, weights of the priorities calculated by using the concentration calculation method are increased. When a ratio of the bitmap transfer drawing API is high, weights of the priorities calculated by using the adjacent pixel comparison method are increased. When the redrawing area ratio is low, weights of the priorities calculated by using the new and old pixel comparison method are increased.

The video driver 123 multiplies the priorities of respective lines calculated by the respective priority calculation methods by the above-described weights calculated according to the images. This process permits calculation results of the priorities on the basis of the respective priority calculation methods, to be corrected according to the image to be displayed. Further, the video driver 123 totalizes the priorities multiplied by the weights of the respective priority calculation methods and sets them as the priorities of the respective lines. Then, the video driver 123 performs the drawing instruction in descending order of the priorities of respective lines.

In the following embodiment, the plurality of priority calculation methods using weighting are combined and the priorities are calculated.

Next, the functions of the video driver 123 will be described in detail.

Figure 8:
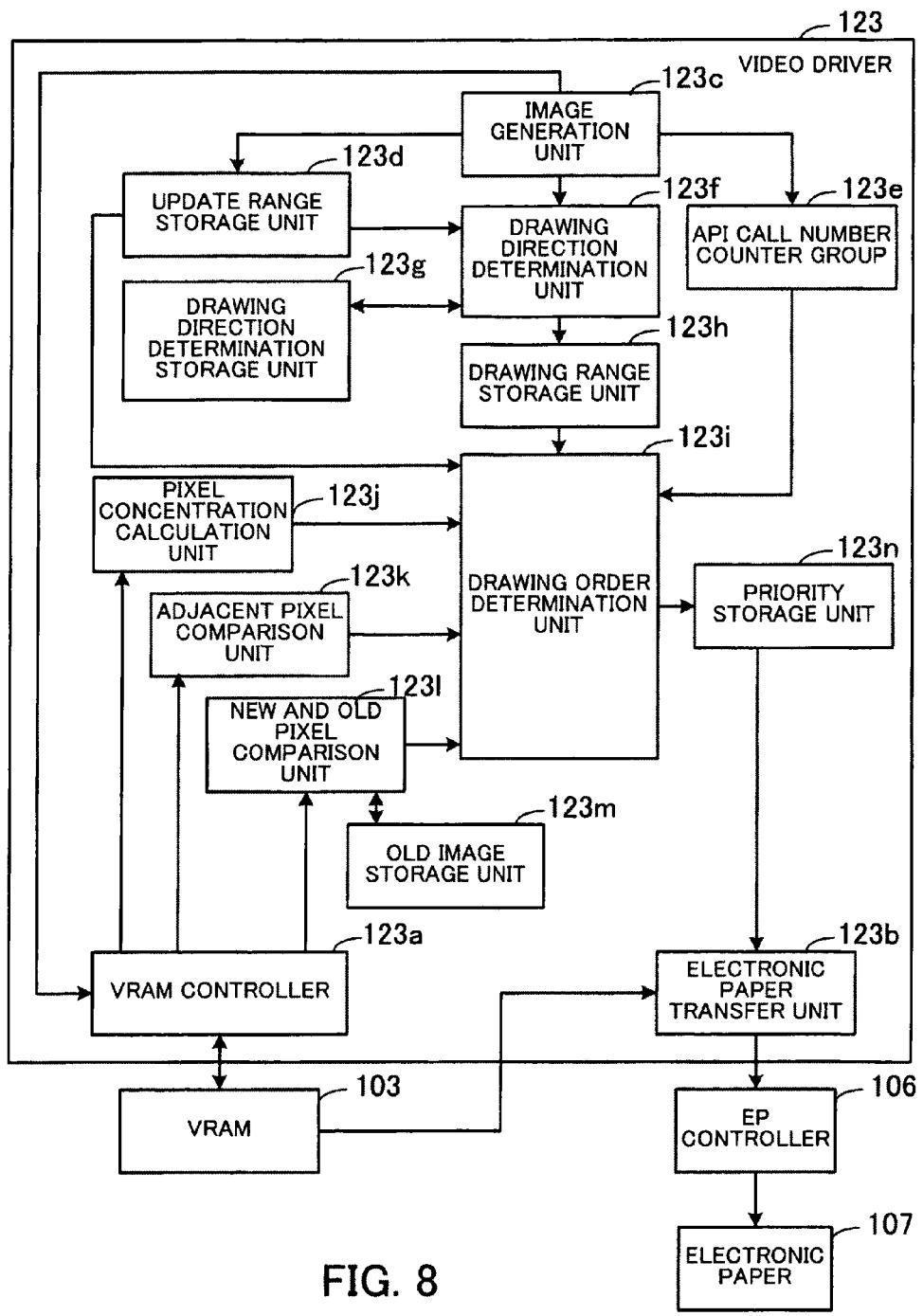
FIG. 8 is a block diagram illustrating functions of a video driver.

FIG. 8 is a block diagram illustrating the functions of the video driver. In addition to the VRAM controller 123a and electronic paper transfer unit 123b illustrated in FIG. 4, the video driver 123 has an image generation unit 123c, an update range storage unit 123d, an API call number counter group 123e, a drawing direction determination unit 123f, a drawing direction determination storage unit 123g, a drawing range storage unit 123h, a drawing order determination unit 123i, a pixel concentration calculation unit 123j, an adjacent pixel comparison unit 123k, a new and old pixel comparison unit 123l, an old image storage unit 123m, and a priority storage unit 123n.

The image generation unit 123c receives the image generation instruction output by the application 121 via the drawing interface unit 122. Then, the image generation unit 123c writes a drawing object (graphics or characters) according to the image generation instruction in the VRAM 103 via the VRAM controller 123a. On this occasion, in the update range storage unit 123d, the image generation unit 123c stores information illustrating an area (update range) in which a graphic is written. Further, the image generation unit 123c discriminates a type of the prepared drawing object on the basis of a type of the function used for the image generation instruction. Then, the image generation unit 123c counts up a value of a counter of the API call number counter group 123e according to a type of the prepared drawing object. When completing generation process of the image of one screen, the image generation unit 123c informs the drawing direction determination unit 123f that generation of a new image is completed.

The update range storage unit 123d has a storage function of storing a range (update range) in which the drawing objects of graphics or characters are written, respectively. For example, a part of a storage area of the memory 102 is used as the update range storage unit 123d.

The API call number counter group 123e is a set of counters indicating the number of times of the drawing operation for the respective types of the drawing objects. For example, the API call number counter group 123e counts the number of times of the drawing operation of straight lines, rectangles, and characters. In addition, the API call number counter group 123e stores counted values in a part of the storage area of the memory 102

When completing generation process of the image of one screen, the drawing direction determination unit 123f refers to the update range storage unit 123d and determines the drawing range and the drawing direction of its drawing range. Concretely, when redrawing all the areas illustrated in the update range, the drawing direction determination unit 123f determines the drawing range and drawing direction in which the number of lines for the drawing operation is minimized. For example, when a plurality of the update ranges are vertically aligned, the drawing direction determination unit 123f makes a determination so as to set an area including its update ranges as one drawing range and draw an image on the vertical lines in the horizontal direction in sequence (drawing direction is "horizontal"). On the contrary, when a plurality of the update ranges are horizontally aligned, the drawing direction determination unit 123f makes a determination so as to set an area including its update ranges as one drawing range and draw the image on the horizontal lines in the vertical direction in sequence (drawing direction is "vertical"). Note that one drawing range may not always be generated on one screen and a plurality of drawing ranges may be generated thereon. When determining the drawing range and the drawing direction, the drawing direction determination unit 123f stores its determination results in the drawing range storage unit 123h.

The drawing range storage unit 123h has a storage function of storing the drawing range and the drawing direction. For example, a part of the storage area of the memory 102 is used as the drawing range storage unit 123h.

The drawing order determination unit 123i calculates the priorities of respective lines of the row and the column, and determines the drawing order of the respective lines according to the priorities. Concretely, the drawing order determination unit 123i refers to the drawing range storage unit 123h and the API call number counter group 123e, and calculates the weights of the respective priority calculation methods. Next, the drawing order determination unit 123i makes a request to the pixel concentration calculation unit 123j for calculation of the priorities of the respective lines on the basis of the concentration comparison on the drawing range. The drawing order determination unit 123i makes a request to the adjacent pixel comparison unit 123k for calculation of the priorities of the respective lines on the basis of the adjacent pixel comparison on the drawing range. Further, the drawing order determination unit 123i makes a request to the new and old pixel comparison unit 123l for calculation of the priorities of the respective lines on the basis of the new and old pixel comparison on the drawing range. Then, the drawing order determination unit 123i receives calculation results from the pixel concentration calculation unit 123j, the adjacent pixel comparison unit 123k, and the new and old pixel comparison unit 123l, respectively, and multiplies the respective calculation results by the weights of the respective priority calculation methods to determine the multiplied calculation results as the priorities of the respective lines. The drawing order determination unit 123i stores the determined priorities in the priority storage unit 123n.

The pixel concentration calculation unit 123j totalizes concentrations of the respective lines of the pixels included in the respective lines according to a request from the drawing order determination unit 123i. Concretely, the pixel concentration calculation unit 123j acquires pixel data (RGB) on the respective lines in the drawing range of the image stored in the VRAM 103 via the VRAM controller 123a. Next, the pixel concentration calculation unit 123*j* calculates the concentrations from the pixel data. The concentration is calculated by using a calculating formula such that as a color is darker, a larger value is acquired. Further, the pixel concentration calculation unit 123*j* totalizes values of the respective lines indicating concentrations of respective pixels. Then, the concentration calculation unit 123*j* transfers the totalized results to the drawing order determination unit 123*i* as concentration values of the respective lines.

According to a request from the drawing order determination unit 123*i*, the adjacent pixel comparison unit 123*k* calculates color differences with respect to adjacent pixels on the respective pixels included in the respective lines, and totalizes the color differences of the respective lines of the respective pixels. Concretely, the adjacent pixel comparison unit 123*k* acquires the pixel data on the respective lines within and around the drawing range of the images stored in the VRAM 103 via the VRAM controller 123*a*. Next, the adjacent pixel comparison unit 123*k* compares the pixel data on the respective pixels to that on the adjacent pixels (pixels of the top right, top left, bottom right, and bottom left sides) of the respective pixels, and finds out the color differences. Further, the adjacent pixel comparison unit 123*k* totalizes values of the respective lines indicating the color differences of the respective pixels. Then, the adjacent pixel comparison unit 123*k* transfers the totalized results to the drawing order determination unit 123*i* as the color difference values of the respective lines.

According to a request from the drawing order determination unit 123*i*, the new and old pixel comparison unit 123*l* calculates color differences with respect to corresponding pixels of the old image, and totalizes the color differences of the respective lines of the respective pixels. Concretely, after completing a drawing process on the electronic paper 107 of the images stored in the VRAM 103, the new and old pixel comparison unit 123*l* acquires the images of the VRAM 103 via the VRAM controller 123*a*, and stores the acquired images in the old image storage unit 123*m*. Thereafter, when the images of the VRAM 103 are updated and a request of a new and old pixel comparison process is input from the drawing order determination unit 123*i*, the new and old pixel comparison unit 123*l* acquires the images in the drawing range among the images (new images) after the update of the VRAM 103. Next, on the respective pixels of the drawing range, the new and old pixel comparison unit 123*l* calculates the color differences between the old images and the new images, and totalizes the color differences of the respective lines of the respective pixels. Then, the new and old pixel comparison unit 123*l* transfers the totalized results to the drawing order determination unit 123*i* as the color differences of the respective lines.

The old image storage unit 123*m* has a storage function of storing the old image. For example, a part of the storage area of the memory 102 is used as the old image storage unit 123*m*.

The priority storage unit 123*n* has a storage function of storing the priorities of the respective lines of the row and the column. For example, a part of the storage area of the memory 102 is used as the priority storage unit 123*n*.

The above-described configuration makes it possible to write the images in the VRAM 103 according to the image generation instruction and perform the drawing process on the electronic paper 107 which performs the display order control on the respective lines. When the images are written in the VRAM 103, the image generation unit 123*c* stores the update range in the update range storage unit 123*d*. At the same time, the image generation unit 123*c* sets the number of times of the drawing operation for the respective types of the drawing objects in the respective counters of the API call number counter group 123*e*.

FIG. 9 illustrates a data structure example of the update range storage unit. In the update range storage unit 123*d*, the update range table 123*da* is stored. On the update range table 123*da*, columns of an area number, a top left coordinates, and a bottom right coordinates are provided.

In the column of the area number, an identification number of the update area having drawn thereon the drawing object is set. In the column of the top left coordinates, the top left coordinates (an x-axis coordinate value and a y-axis coordinate value) at the time of cutting the update area in a rectangle are set. In the column of the bottom right coordinates, the bottom right coordinates at the time of cutting the update area in a rectangle are set.

Figure 10:
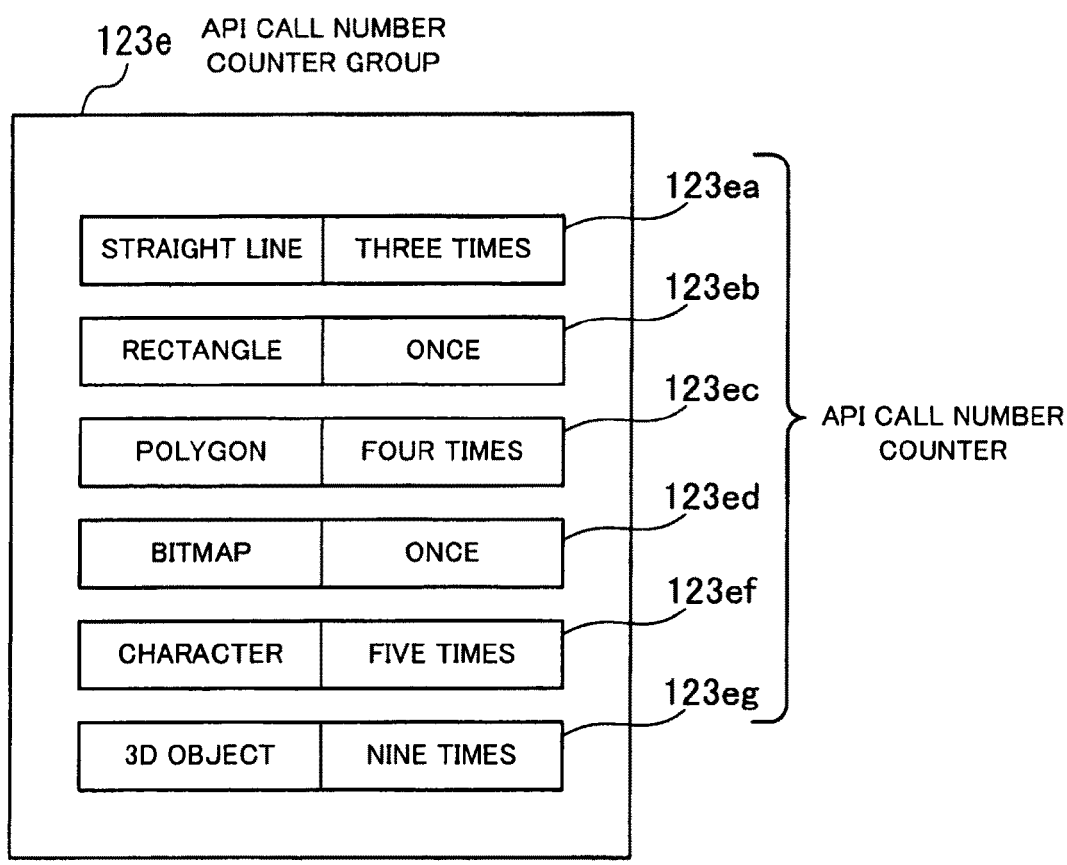
FIG. 10 illustrates an example of an API call number counter group.

FIG. 10 illustrates an example of the API call number counter group. The API call number counter group 123*e* is configured by the plurality of API call number counters 123*ea* to 123*eg*. The API call number counters 123*ea* to 123*eg* are associated with the functions of drawing instructions using the API for an image process, respectively. In an example of FIG. 10, the API call number counters 123*ea* to 123*eg* are associated with the functions of the drawing instructions of a straight line, rectangle, polygon, bitmap, character, and 3D object, respectively. Further, the API call number counters 123*ea* to 123*eg* sequentially count up a value from one whenever the corresponding function is called out at the time of generating the image. As a result, respective values of the API call number counters 123*ea* to 123*eg* at the time when the images of one screen are generated by the image generation unit 123*c* are equal to the number of times of API call (hereinafter, referred to as the API call number) of the functions corresponding to the API call number counters 123*ea* to 123*eg*.

When completing the generation of the images of one screen, the image generation unit 123*c* starts a drawing process to the electronic paper 107 of the images of the VRAM 103.

Figure 11:
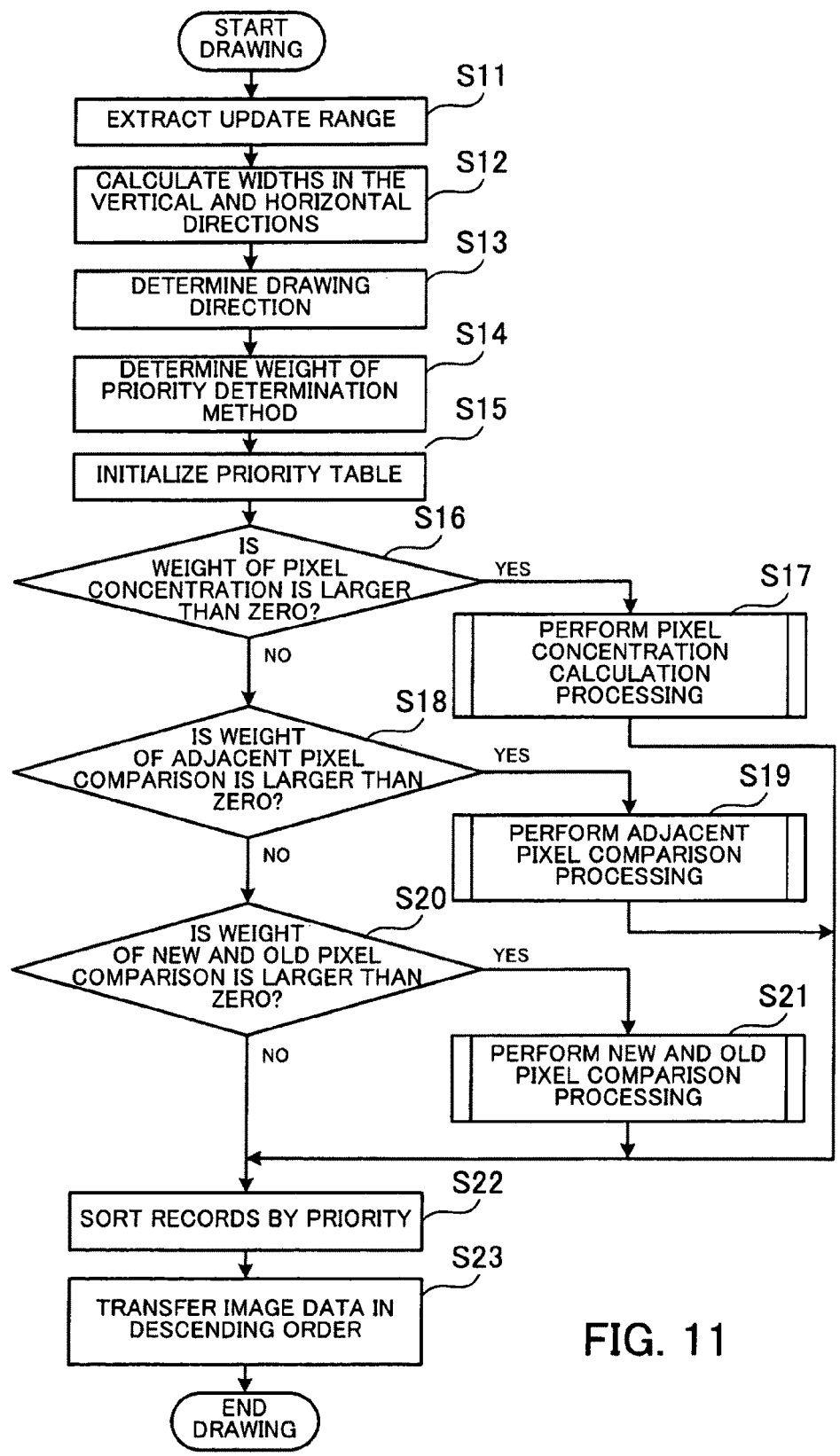
FIG. 11 is a flowchart illustrating a procedure of a drawing process.

FIG. 11 is a flowchart illustrating a procedure of the drawing process. Hereinafter, the process illustrated in FIG. 11 will be described along step numbers.

[Step S11] The drawing direction determination unit 123*f* refers to the update range table 123*da*, and extracts the update range in which a writing operation of a graphic is performed.

[Step S12] The drawing direction determination unit 123*f* calculates widths (the number of lines) in the vertical and horizontal directions on the respective update ranges.

[Step S13] The drawing direction determination unit 123*f* finds out a combination in which the totalized lines are minimized from the combinations of the drawing directions of the respective update ranges. The drawing direction determination unit 123*f* determines the drawing directions of the combination found out herein as the drawing directions of the respective update ranges. The drawing direction determination unit 123*f* determines as the drawing range all the lines in the drawing direction of passing by the update range. Further, the drawing direction determination unit 123*f* stores the drawing range and the drawing direction in the drawing range storage unit 123*h*.

[Step S14] The drawing order determination unit 123*i* determines weights of the respective priority determination methods. Concretely, the drawing order determination unit 123*i* determines the weights by using the API call ratio of the application and the redrawing area ratio.

For the purpose of calculating an API call ratio of the application, the drawing order determination unit 123*i* acquires the API call numbers (equal to the number of the prepared drawing objects of the relevant type) of the respective types of the drawing objects from the API call number counter group 123e. Then, the drawing order determination unit 123i calculates the API call ratio of respective drawing APIs with respect to the whole image. That is, all values of the API call number counters are totalized and the respective API call numbers are divided by its total value.

Further, for the purpose of calculating the redrawing area ratio, the drawing order determination unit 123i extracts information on the update ranges from the update range storage unit 123d. Then, the drawing order determination unit 123i calculates ratios of the occupied update ranges to the whole image area. In the present embodiment, suppose that a size of the image is 1024 (the number of pixels in the vertical direction)×768 (the number of pixels in the horizontal direction). In this case, when the whole number of the pixels included in the update range is divided by the number (1024×768) of the pixels of the whole image, the redrawing area ratio is acquired.

The drawing order determination unit 123i calculates the weights of the respective priority calculation methods from the call ratio and redrawing area ratio of the respective drawing APIs. Concretely, the following calculations are performed.

Weight of pixel concentration method=redrawing area ratio×(character string drawing API call ratio+ rectangle drawing API call ratio)

Weight of adjacent pixel comparison method=redrawing area ratio×bitmap transfer API call ratio Weight of new and old pixel comparison method=1− redrawing area ratio The above-described calculation permits the weights of the respective priority calculation methods to be calculated. For example, in the case of the redrawing area ratio: 40%, the character string drawing API call ratio: 60%, the rectangle drawing API call ratio: 30%, and the bitmap transfer API call ratio: 10%, the weight of the pixel concentration method is equal to 0.36(=0.4×(0.6+0.3)). The weight of the adjacent pixel comparison method is equal to 0.04(=0.4×0.1). Further, the weight of the new and old pixel comparison method is equal to 0.60(=1-0.4).

[Step S15] The drawing order determination unit 123i initializes a priority table stored in the priority storage unit 123n. That is, the drawing order determination unit 123i sets to zero the values of the priorities of all the lines (the total: 1792 lines) of the row lines [0] to [1023] and the column lines [0] to [767].

[Step S16] The drawing order determination unit 123i determines whether the weight of the pixel concentration method is larger than zero. If YES, the process goes to step S17. If NO, the process goes to step S18.

[Step S17] The drawing order determination unit 123i performs a pixel concentration calculation process. Details of this process will be described below. Thereafter, the process goes to step S22.

[Step S18] The drawing order determination unit 123i determines whether the weight of the adjacent pixel comparison method is larger than zero. If YES, the process goes to step S19. If NO, the process goes to step S20.

[Step S19] The drawing order determination unit 123i performs an adjacent pixel comparison process. Details of this process will be described below. Thereafter, the process goes to step S22.

[Step S20] The drawing order determination unit 123i determines whether the weight of the new and old pixel comparison method is larger than zero. If YES, the process goes to step S21. If NO, the process goes to step S22.

[Step S21] The drawing order determination unit 123i performs a new and old adjacent pixel comparison process. Details of this process will be described below.

[Step S22] The drawing order determination unit 123i sorts, by using the priority, records of the respective lines registered in the priority table of the priority storage unit 123n.

[Step S23] The electronic paper transfer unit 123b selects the respective lines in descending order of the priorities stored in the priority table of the priority storage unit 123n, and transfers the image data on the selected lines from the VRAM 103 to the EP controller 106.

As described above, the priorities of the respective lines according to contents of the image are determined and the image is drawn on the electronic paper 107 in descending order of the priorities.

Here, steps S11 to S13 will be described with reference to specific examples.

Figure 12:
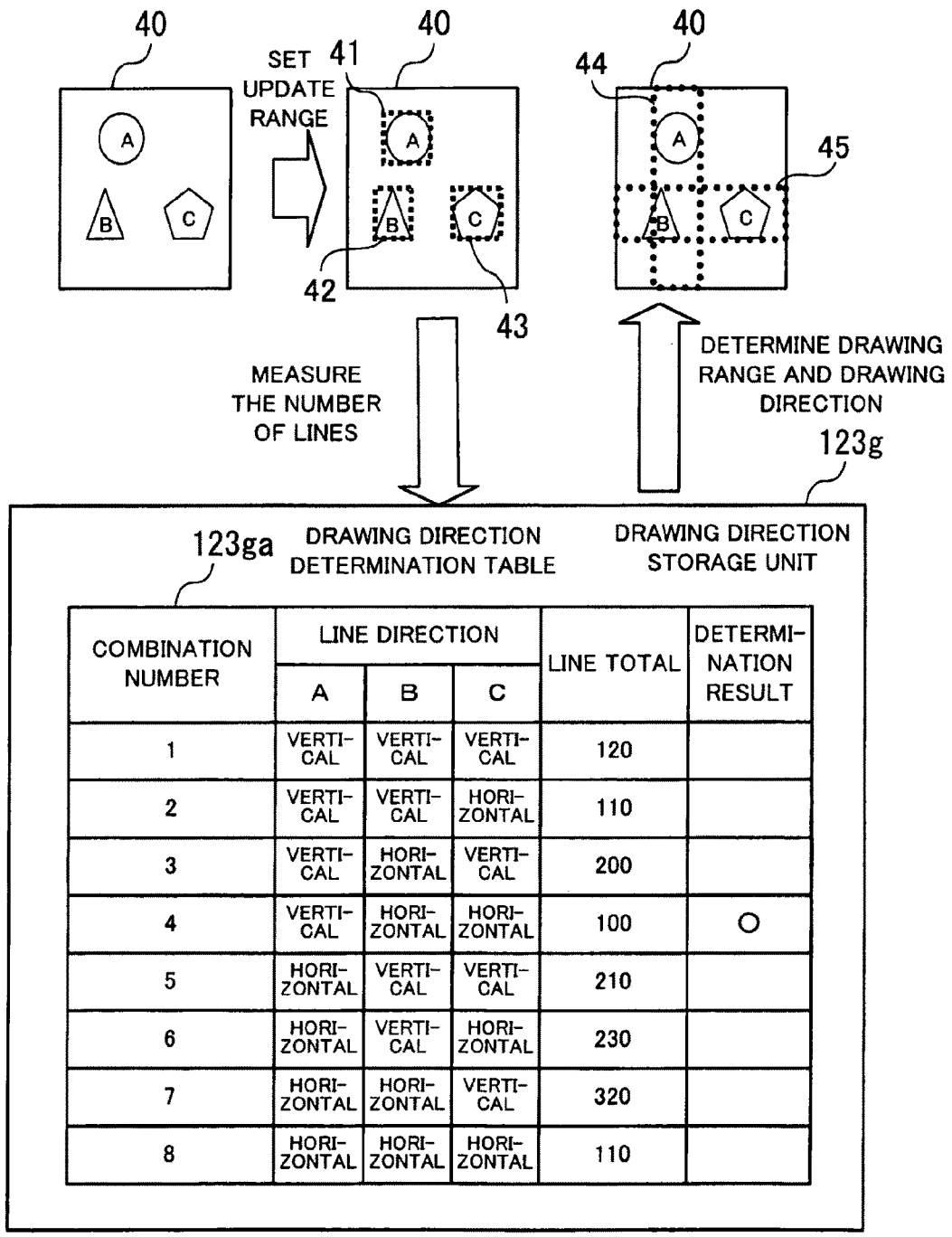
FIG. 12 illustrates a determination procedure of a drawing range and a drawing direction.

FIG. 12 illustrates a determination procedure of the drawing range and the drawing direction. For the purpose of determining the drawing range and the drawing direction, a drawing direction determination table 123ga of the drawing direction determination storage unit 123g is used. The drawing direction determination table 123ga is prepared by using the update range table 123da.

Suppose, for example, that an image 40 having drawn thereon three graphics of A, B, and C is generated. At this time, in the update range table 123da, there are registered the update ranges 41, 42, and 43 surrounding the respective graphics by rectangles. Then, the drawing direction determination unit 123f refers to the update range table 123da, and generates the drawing direction determination table 123ga in the drawing direction determination storage unit 123g.

On the drawing direction determination table 123ga, columns of a combination number, a line direction, a line total, and a determination result are provided. In the column of the combination number, the identification number of the combination of the line directions in the case of drawing respective drawing objects is set.

In the column of the line direction, the line direction at the time of drawing the respective drawing objects is set. A term "vertical" represents that the drawing object is drawn on the vertical lines (column). A term "horizontal" represents that the drawing object is drawn on the horizontal lines (row).

In the column of the line total, the total number of lines necessary for the drawing process is set in the case in which the respective drawing objects are drawn on the lines indicated in the line direction. In the column of the determination result, a flag (a round mark in FIG. 12) is set for the combination in which the line total is minimized.

In an example of FIG. 12, when graphics of B and C are drawn on the horizontal lines, a number of lines are overlapped with each other. For the purpose, in the case in which the graphic (a slightly vertically-long ellipse shape) of A is drawn on the vertical lines, and the graphics of B and C are drawn on the horizontal lines, the line total is minimized. As a result, the drawing range 44 for drawing the graphic on the vertical lines and the drawing range 45 for drawing the graphics on the horizontal lines are determined.

When the drawing ranges are determined, these drawing ranges and drawing direction are set in the drawing range storage unit 123h.

Figure 13:
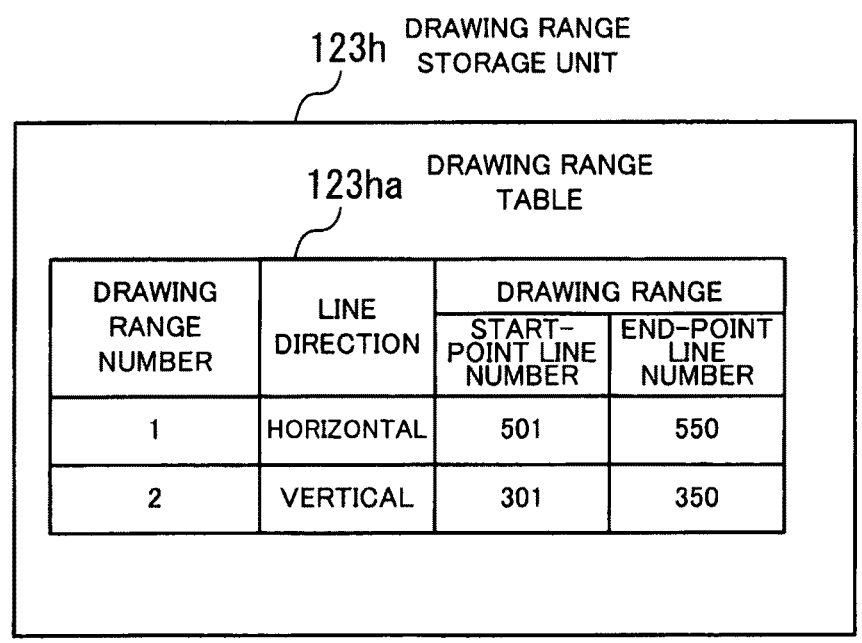
FIG. 13 illustrates an example data structure of a drawing range storage unit.

FIG. 13 illustrates a data structure example of the drawing range storage unit. On the drawing range storage unit 123h, a drawing range table 123ha is provided. On the drawing range table 123ha, columns of the drawing range number, the line direction, and the drawing range are provided.

In the column of the drawing range number, the identification number for identifying the drawing range is set. In the column of the line direction, a direction of the lines having drawn thereon an image is set. A term "horizontal" represents that a drawing object is drawn on the horizontal lines (row). A term "vertical" represents that the drawing object is drawn on the vertical lines (column).

The column of the drawing range is divided into columns of a start-point line number and an end-point line number. In the column of the start-point line number, the line number of the line being a start-point position of the drawing range is set. In the column of the end-point line number, the line number of the line being an end-point position of the drawing range is set.

There are calculated the priorities of the respective lines of the drawing range illustrated in this drawing range table 123ha.

Next, detailed procedures of the respective priority calculation methods will be described. First, the pixel concentration calculation process will be described.

Figure 14:
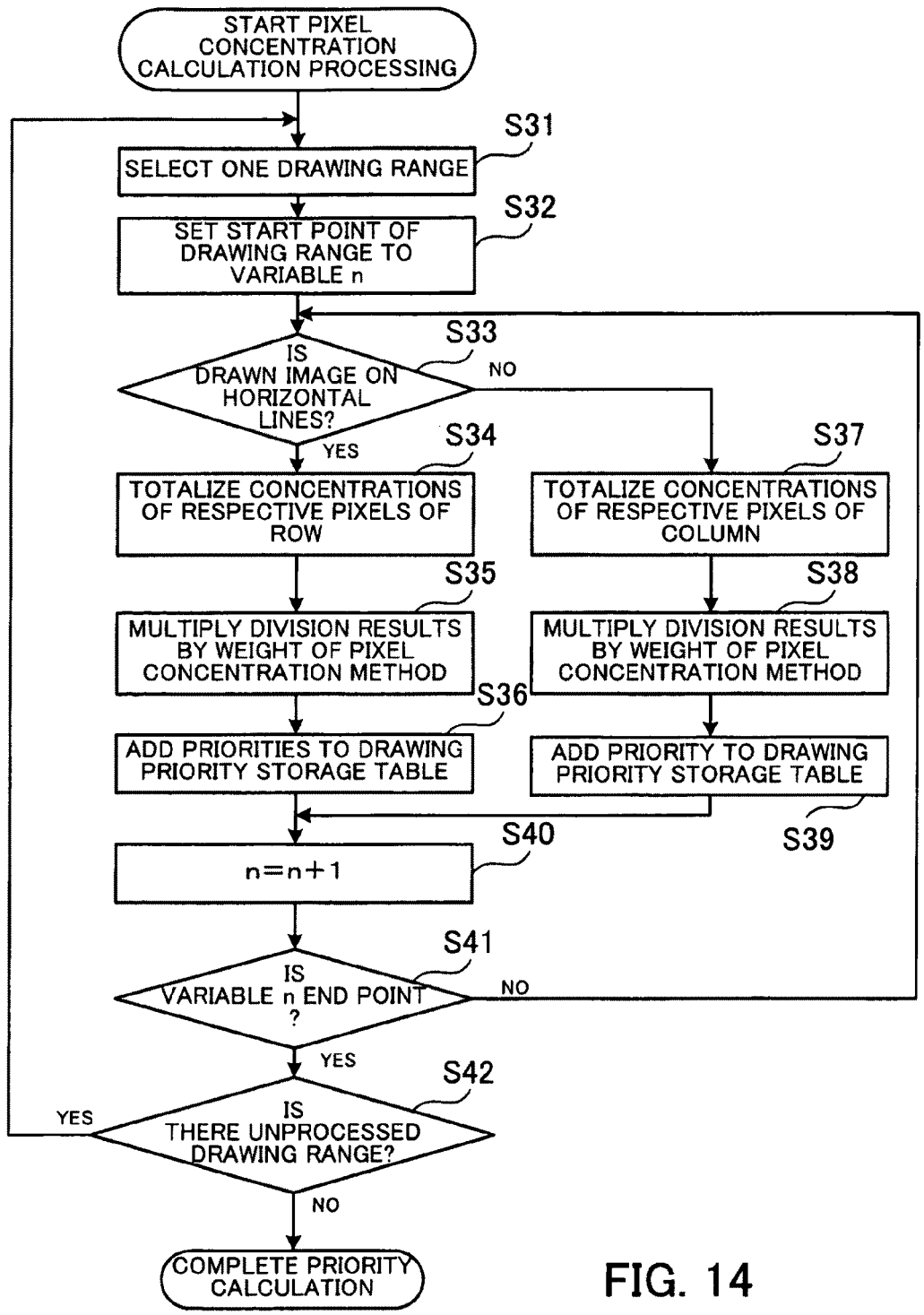
FIG. 14 is a flowchart illustrating a procedure of a pixel concentration calculation processing.

FIG. 14 is a flowchart illustrating a procedure of the pixel concentration calculation process. Hereinafter, the process illustrated in FIG. 14 will be described along step numbers.

[Step S31] The drawing order determination unit 123i selects one unprocessed drawing range from the drawing range storage unit 123h. On this occasion, the drawing order determination unit 123i acquires the line number of the start-point position of the selected drawing range, the line number of the end-point position thereof, and the line direction for drawing an image thereof from the drawing range table 123ha. Then, the drawing order determination unit 123i transfers information on the selected drawing range to the pixel concentration calculation unit 123j, and makes a request to the pixel concentration calculation unit 123j for calculation of the pixel concentration.

[Step S32] The pixel concentration calculation unit 123j sets to a variable n the line number of a line being a start point of the drawing range.

[Step S33] The pixel concentration calculation unit 123j determines whether the image is drawn on the lines in the horizontal direction as the drawing direction. If YES, the process goes to step S34. If NO, the process goes to step S37.

[Step S34] The pixel concentration calculation unit 123j totalizes concentrations of the pixels of the line with the line number n. Concretely, the pixel concentration calculation unit 123j acquires the image data (RGB) on the row lines with the specified line numbers from the VRAM 103 via the VRAM controller 123a. Next, the pixel concentration calculation unit 123j calculates concentrations on the respective pixels of the acquired lines. Here, suppose that the column number of the pixels is determined as c (c is an integer of 0 to 767), and concentrations of the pixels with the column number c are determined as Yc. In this case, Yc is represented by the following formula.

$$Yc=10000-2989\times R+5866\times G+1145\times B$$

Here, R is a luminance value of a red color of the pixel. G is a luminance value of a green color of the pixel. B is a luminance value of a blue color of the pixel. Further, values which are multiplied to R, G, and B are coefficients for acquiring luminance values. Gamma control is a process for adjusting a luminance such that a display color of a screen is white at the time of maximizing respective values of R, G, and B.

The pixel concentration calculation unit 123j totalizes the concentrations Yc of the respective pixels of the selected lines and sets the total values as a variable sum.

[Step S35] The drawing order determination unit 123i divides the total values (variable sum) by 10000, multiplies the division results by the weight of the pixel concentration method, and determines the multiplication results as the priorities on the basis of the pixel concentrations of the selected lines. Namely, the following calculation is performed.

Priorities on the basis of pixel concentrations=(sum/10000)×weight of pixel concentration method

[Step S36] The drawing order determination unit 123i adds the priorities on the basis of the pixel concentrations to those matched with the line numbers of the selected lines and set in the priority storage unit 123n. Thereafter, the process goes to step S40.

[Step S37] The pixel concentration calculation unit 123j totalizes concentrations of the pixels of the line with the line number n. Concretely, the pixel concentration calculation unit 123j acquires the image data (RGB) on the row line with the specified line number from the VRAM 103 via the VRAM controller 123a. Next, the pixel concentration calculation unit 123j calculates concentrations on the respective pixels of the acquired lines. Here, suppose that the row number of the pixels is determined as r (r is an integer of 0 to 1023) and the concentrations of the pixels with the row number r are determined as Yr. In this case, Yr is represented by the following formula.

$$Yr=10000-2989\times R+5866\times G+1145\times B$$

The pixel concentration calculation unit 123j totalizes the concentrations Yr of the respective pixels of the selected lines and sets the total values to the variable sum.

[Step S38] The drawing order determination unit 123i divides the total values (variable sum) by 10000, multiplies the division results by the weight of the pixel concentration method, and determines the multiplication results as the priorities on the basis of the pixel concentrations of the selected lines. Namely, the following calculation is performed.

Priorities on the basis of pixel concentrations=(sum/10000)×weight of pixel concentration method

[Step S39] The drawing order determination unit 123i adds the priorities on the basis of the pixel concentrations to those matched with the line numbers of the selected lines and set in the priority storage unit 123n.

[Step S40] The drawing order determination unit 123i counts up (increments) a value of the variable n by one.

[Step S41] The drawing order determination unit 123i determines whether the variable n is the line number of an end-point position of the drawing range. If YES, the process goes to step S42. If NO, the process goes to step S33.

[Step S42] The drawing order determination unit 123i determines whether there is an unprocessed drawing range in the drawing range table 123ha. If YES, the process goes to step S31. If NO, the pixel concentration calculation process ends.

Next, the adjacent pixel comparison method will be described.

Figure 15:
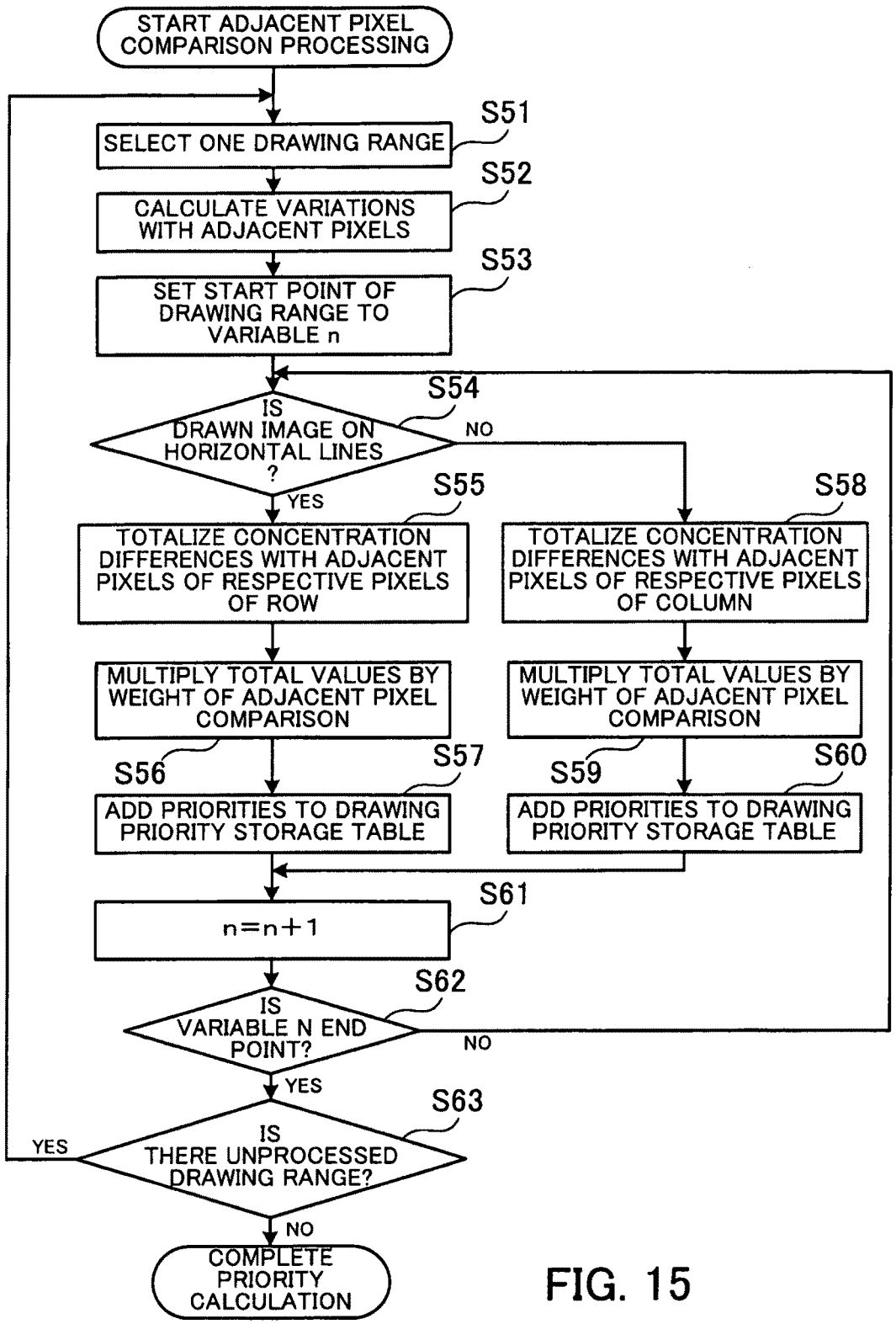
FIG. 15 is a flowchart illustrating a procedure of an adjacent pixel comparison processing.

FIG. 15 is a flowchart illustrating a procedure of the adjacent pixel comparison process. Hereinafter, the process illustrated in FIG. 15 will be described along step numbers.

[Step S51] The drawing order determination unit 123i selects one unprocessed drawing range from the drawing range storage unit 123h. On this occasion, the drawing order determination unit 123i acquires the line number of the line being a start-point position of the selected drawing range, the line number of the line being an end-point position thereof, and the line direction for drawing an image thereof from the drawing range table 123ha. Then, the drawing order determination unit 123i transfers information on the selected drawing range to the adjacent pixel comparison unit 123k, and makes a request to the adjacent pixel comparison unit 123k for calculation of the pixel concentrations.

[Step S52] The adjacent pixel comparison unit 123k calculates variations with respect to the adjacent pixels on all the pixels of the drawing range. Concretely, the adjacent pixel comparison unit 123k acquires images from the VRAM 103 via the VRAM controller 123a. Next, the adjacent pixel comparison unit 123k calculates, as an object to be calculated, all the pixels with the coordinates whose x-coordinate is included in the range of x0 to x1 and whose y-coordinate is included in the range of y0 to y1 on the basis of the top left coordinates (x0, y0) and the bottom right coordinates (x1, y1) of the drawing range. Further, the adjacent pixel comparison unit 123k calculates the variable D(x, y) by using a Laplacian filter on all the pixels to be calculated. Here, the Laplacian filter is used in an image process of calculating a secondary differentiation of the space and detecting an outline of the space. When subjecting the Laplacian filter to the image, as the pixel has a larger concentration difference with respect to the adjacent pixels, a value of the variation D(x, y) becomes larger.

[Step S53] The adjacent pixel comparison unit 123k sets the line number of the line being a start-point position of the drawing range to the variable n.

[Step S54] The adjacent pixel comparison unit 123k determines whether the image is drawn on the lines in the horizontal direction as the drawing direction. If YES, the process goes to step S55. If NO, the process goes to step S58.

[Step S55] The adjacent pixel comparison unit 123k totalizes the variations of the pixels of the line whose line number in the horizontal direction (row) is n. Concretely, the adjacent pixel comparison unit 123k totalizes the variations D(c, n) in the case where the column number c of the pixels is respective values of 0 to 767, and sets the total values to the variable sum.

[Step S56] The drawing order determination unit 123i multiplies the total values (variable sum) by the weight of the adjacent pixel comparison method, and sets the multiplication results as the priorities of the selected lines on the basis of the adjacent pixel comparison method. Namely, the following calculation is performed.

Priorities on the basis of adjacent pixel comparison=sum×weight of adjacent pixel comparison method

[Step S57] The drawing order determination unit 123i adds the priorities on the basis of the adjacent pixel comparison method to those matched with the line numbers of the selected lines and set in the priority storage unit 123n. Thereafter, the process goes to step S61.

[Step S58] The adjacent pixel comparison unit 123k totalizes the variations of the pixels of the line whose line number in the vertical direction (column) is n. Concretely, the adjacent pixel comparison unit 123k totalizes the variations D(n, r) in the case where the row number r of the pixel is respective values of 0 to 1023, and sets the total values to the variable sum.

[Step S59] The drawing order determination unit 123i multiplies the total values (variable sum) by the weight of the adjacent pixel comparison method, and determines the multiplication results as the priorities of the selected lines on the basis of the adjacent pixel comparison. Namely, the following calculation is performed.

Priorities on the basis of adjacent pixel comparison=sum×weight of adjacent pixel comparison method

[Step S60] The drawing order determination unit 123i adds the priorities on the basis of the adjacent pixel comparison to those matched with the line numbers of the selected lines and set in the priority storage unit 123n.

[Step S61] The drawing order determination unit 123i counts up (increments) a value of the variable n by one.

[Step S62] The drawing order determination unit 123i determines whether the variable n is the line number of the line being an end-point position of the drawing range. If YES, the process goes to step S63. If NO, the process goes to step S54.

[Step S63] The drawing order determination unit 123i determines whether there is an unprocessed drawing range in the drawing range table 123ha. If YES, the process goes to step S51. If NO, the adjacent pixel comparison process ends.

Next, the new and old pixel comparison method will be described.

Figure 16:
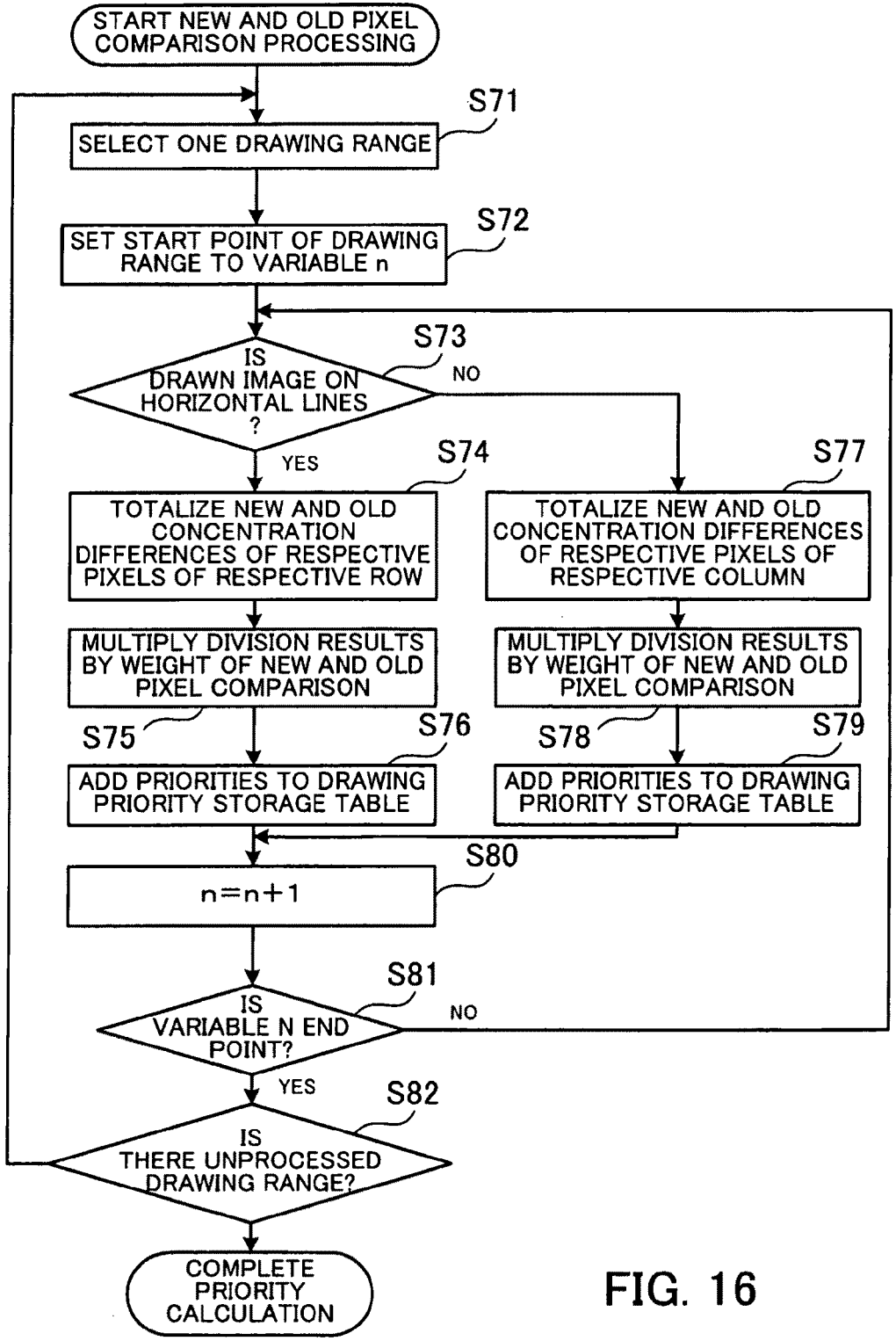
FIG. 16 is a flowchart illustrating a procedure of a new and old pixel comparison process.

FIG. 16 is a flowchart illustrating a procedure of the new and old pixel comparison process. Hereinafter, the process illustrated in FIG. 16 will be described along step numbers.

[Step S71] The drawing order determination unit 123i selects one unprocessed drawing range from the drawing range storage unit 123h. On this occasion, the drawing order determination unit 123i acquires the line number of the line being a start-point position of the selected drawing range, the line number of the line being an end-point position thereof, and the line direction for drawing an image thereof from the drawing range table 123ha. Then, the drawing order determination unit 123i transfers information on the selected drawing range to the new and old pixel comparison unit 123l, and makes a request to the new and old pixel comparison unit 123l for calculation of the pixel concentrations.

[Step S72] The new and old pixel comparison unit 123l sets the line number of the line being a start-point position of the drawing range to the variable n.

[Step S73] The new and old pixel comparison unit 123l determines whether the image is drawn on the lines in the horizontal direction as the drawing direction. If YES, the process goes to step S74. If NO, the process goes to step S77.

[Step S74] The new and old pixel comparison unit 123l totalizes concentrations of the pixels of the line with the line number n. Concretely, the new and old pixel comparison unit 123l acquires the image data (RGB) on the row line with the specified line number from the VRAM 103 via the VRAM controller 123a. In addition, the new and old pixel comparison unit 123l acquires the image data (RGB) on the row line of the specified line number from the old image storage unit 123m.

Next, the new and old pixel comparison unit 123l calculates a concentration difference d between a new pixel and an old pixel on the respective pixels of the acquired lines. Here, suppose, for example, that a concentration difference dc of the column number c is calculated. In this case, the concentration difference dc is represented by the following formula.

$dc=2989 \times |pre\_Rc-cur\_Rc|+5866 \times |pre\_Gc-cur\_Gc|+1145 \times |pre\_Bc-cur\_Bc|$ Here, the term pre_R indicates a luminance value of a red color of a c-th pixel (old pixel) of an n-th column line of an old screen. The term cur_R indicates a luminance value of a red color of a c-th pixel (new pixel) of an n-th column line of a new screen. The term pre_G indicates a luminance value of a green color of the c-th pixel (old pixel) of the n-th column line of the old screen. The term cur_G indicates a luminance value of a green color of the c-th pixel (new pixel) of the n-th column line of the new screen. The term pre_B indicates a luminance value of a blue color of the c-th pixel (old pixel) of the n-th column line of the old screen. The term cur_B indicates a luminance value of a blue color of the c-th pixel (new pixel) of the n-th column line of the new screen. Values multiplied to a difference between the new pixel and the old pixel are coefficients for acquiring luminance values.

The new and old pixel comparison unit 123*l* totalizes the concentration differences dc of respective pixels of the selected lines, and sets the total values to the variable sum.

[Step S75] The drawing order determination unit 123*i* divides the total values (variable sum) by 10000, multiplies the division results by the weight of the new and old pixel comparison method, and determines the multiplication results as the priorities of the selected lines on the basis of the pixel concentrations. Namely, the following calculation is performed.

Priorities on the basis of new and old pixel comparison=(sum/10000)×weight of pixel concentration method

[Step S76] The drawing order determination unit 123*i* adds the priorities on the basis of the new and old pixel comparison to those matched with the line numbers of the selected lines and set in the priority storage unit 123*n*. Thereafter, the process goes to step S80.

[Step S77] The new and old pixel comparison unit 123*l* totalizes concentrations of the pixels of the line with the line number n. Concretely, the new and old pixel comparison unit 123*l* acquires the image data (RGB) on the column line with the specified line number from the VRAM 103 via the VRAM controller 123*a*. Further, the new and old pixel comparison unit 123*l* acquires the image data (RGB) on the column line with the specified line number from the old image storage unit 123*m*.

Next, the new and old pixel comparison unit 123*l* calculates the concentration difference d between the new pixel and the old pixel on the respective pixels of the acquired lines. Here, suppose, for example, that a concentration difference dr of the row number r is calculated. In this case, the concentration difference dr is represented by the following formula.

$dr=2989 \times |pre\_Rr-cur\_Rr|+5866 \times |pre\_Gr-cur\_Gr|+1145 \times |pre\_Br-cur\_Br|$ Here, the term pre_Rr indicates a luminance value of a red color of an r-th pixel (old pixel) of the n-th column line of the old screen. The term cur_Rr indicates a luminance value of a red color of an r-th pixel (new pixel) of the n-th column line of the new screen. The term pre_G indicates a luminance value of a green color of the r-th pixel (old pixel) of the n-th column line of the old screen. The term cur_G indicates a luminance value of a green color of the r-th pixel (new pixel) of the n-th column line of the new screen. The term pre_B indicates a luminance value of a blue color of the r-th pixel (old pixel) of the n-th column line of the old screen. The term cur_B indicates a luminance value of a blue color of the r-th pixel (new pixel) of the n-th column line of the new screen. Values multiplied to a difference between the new pixel and the old pixel are coefficients for acquiring luminance values.

The new and old pixel comparison unit 123*l* totalizes the concentration differences dr of the respective pixels of the selected lines, and sets the total values to the variable sum.

[Step S78] The drawing order determination unit 123*i* divides the total values (variable sum) by 10000, multiplies the division results by the weight of the new and old pixel comparison method, and determines the multiplication results as the priorities of the selected lines on the basis of the pixel concentrations. Namely, the following calculation is performed.

Priorities on the basis of new and old pixel comparison=(sum/10000)×weight of pixel concentration method

[Step S79] The drawing order determination unit 123*i* adds the priorities on the basis of the new and old pixel comparison to those matched with the line numbers of the selected lines and set in the priority storage unit 123*n*.

[Step S80] The drawing order determination unit 123*i* counts up (increments) a value of the variable n by one.

[Step S81] The drawing order determination unit 123*i* determines whether the variable n is the line number of the line being an end-point position of the drawing range. If YES, the process goes to step S82. If NO, the process goes to step S73.

[Step S82] The drawing order determination unit 123*i* determines whether there is an unprocessed drawing range in the drawing range table 123*ha*. If YES, the process goes to step S71. If NO, the pixel concentration calculation process ends.

As described above, the priorities of the respective lines in the drawing range on the basis of the respective priority calculation methods are corrected by correction values and then added together. Then, values after the addition are set in the priority storage unit 123*n*.

FIG. 17 illustrates a data structure example of the priority storage unit. In the priority storage unit 123*n*, a priority table 123*na* is stored. On the priority table 123*na*, columns of the direction, the line number, and the priority are provided.

In the column of the direction, the direction of the line is illustrated either by the line (row) in the horizontal direction or by the line (column) in the vertical direction. In the column of the line number, the identification number in the row or column direction of the line is set. In the column of the priority, the priority of the line is set. Note that in the lines out of the drawing range, the priority "zero" during the initialization is still left.

In the above-described priority table 123*na*, the priority is set to the line, and then respective records are sorted by using the priority (as the priority is higher, the record is upper). As a result, when the lines in the horizontal and vertical directions are mixedly present, the records are aligned in descending order of the priorities.

The electronic paper transfer unit 123*b* refers to the above-described priority table 123*na*, and transfers the image data on the respective lines from the VRAM 103 to the EP controller 106. Concretely, the electronic paper transfer unit 123*b* instructs the EP controller 106 to delete the lines whose priorities are larger than zero (lines to be updated). Next, the electronic paper transfer unit 123*b* selects the lines in descending order of the priorities, and sequentially transfers the image data on the relevant lines in the VRAM 103 to the EP controller 106 to instruct the EP controller 106 to draw an image. When completing by once the transfer of the image data on all the lines to be updated, the electronic paper transfer unit 123*b* anew selects the lines in descending order of the priorities, and sequentially transfers the image data on the relevant lines in the VRAM 103 to the EP controller 106 to instruct the EP controller 106 to draw the image. This process permits the image to be drawn on the electronic paper 107 by performing two times of overwriting operations in descending order of the priorities of the respective lines.

Figure 18:
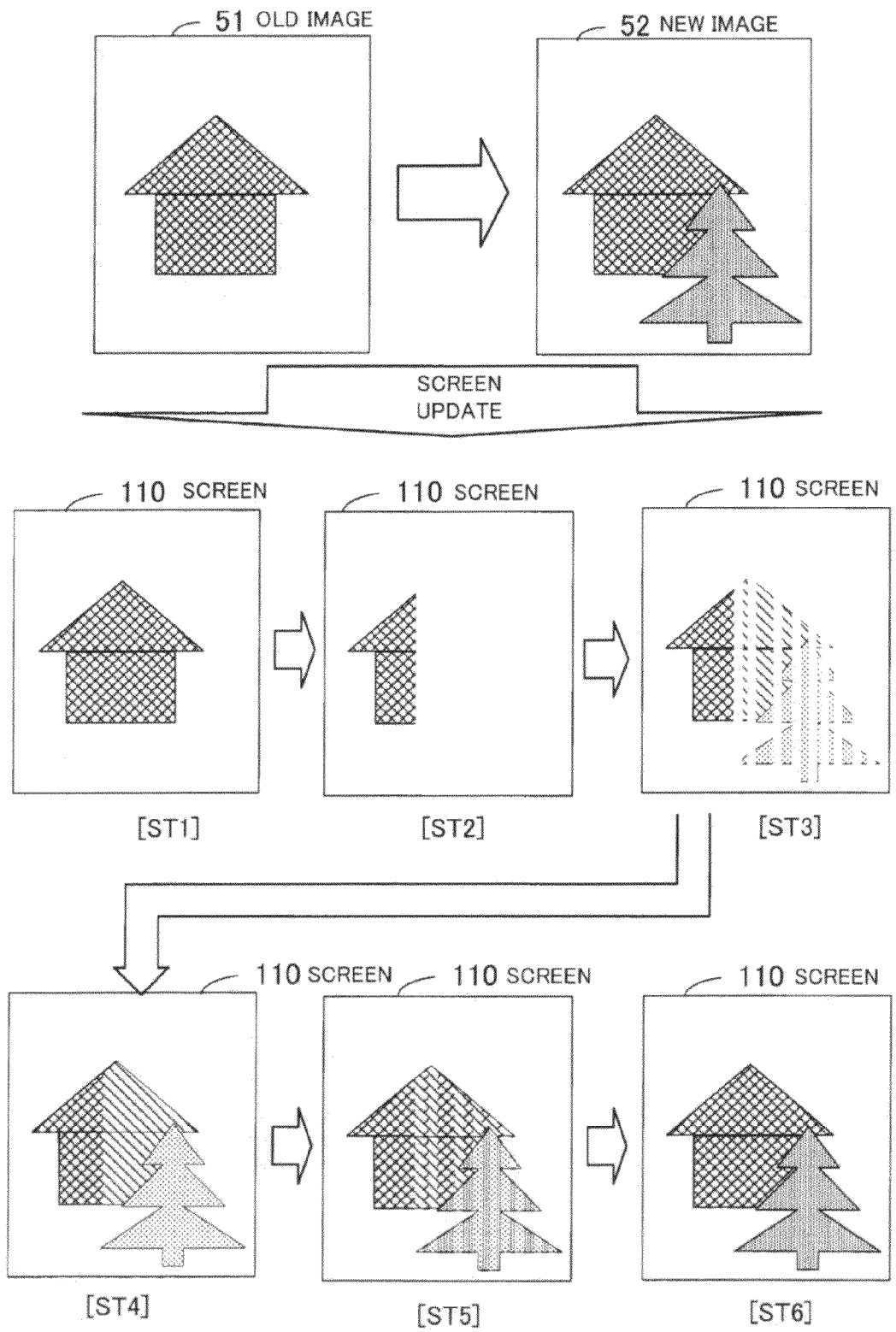
FIG. 18 illustrates a screen transition at the time of drawing an image with vertical lines.

FIG. 18 illustrates a screen transition at the time of drawing the image on the lines in the vertical direction. In an example of FIG. 18, a tree is added to an old image 51 in which a house is drawn and a new image 52 is generated. A graphic of the tree is vertically long. Therefore, the number of the lines is reduced in the image in which the image is redrawn on the vertical lines. As a result, the image is redrawn on the vertical lines.

In this example, two times of the drawing operations are performed. On this occasion, during a first drawing operation, a voltage application time is shortened and the whole image is drawn. During a second drawing operation, a voltage is further applied so as to clearly emit a color.

A first state (ST1) illustrates a screen 110 on which the old image 51 is displayed. When an instruction of the screen update is input in this state, only a portion to be redrawn is deleted. A second state (ST2) illustrates the screen 110 after the deletion of a change part. In this example, the vertical lines of a portion having drawn thereon the tree are deleted.

Next, the image is drawn on the respective lines in descending order of the priorities of the lines. A third state (ST3) illustrates a state in which the image is drawn on about half of the lines. In this example, when values of the priorities are about the same as each other, the lines are selected in an interlacing way or at random and the image is drawn. For example, when only several high-order digit numbers of values illustrating the priorities are compared and the values are the same as each other, the priorities are determined to be about the same as each other.

A fourth state (ST4) illustrates a state in which the first drawing operation is completed. A fifth state (ST5) illustrates a state in which about half of the second drawing operation is performed on the lines. A sixth state (ST6) illustrates a state in which two times of the drawing operations are completed on all the lines.

Figure 19:
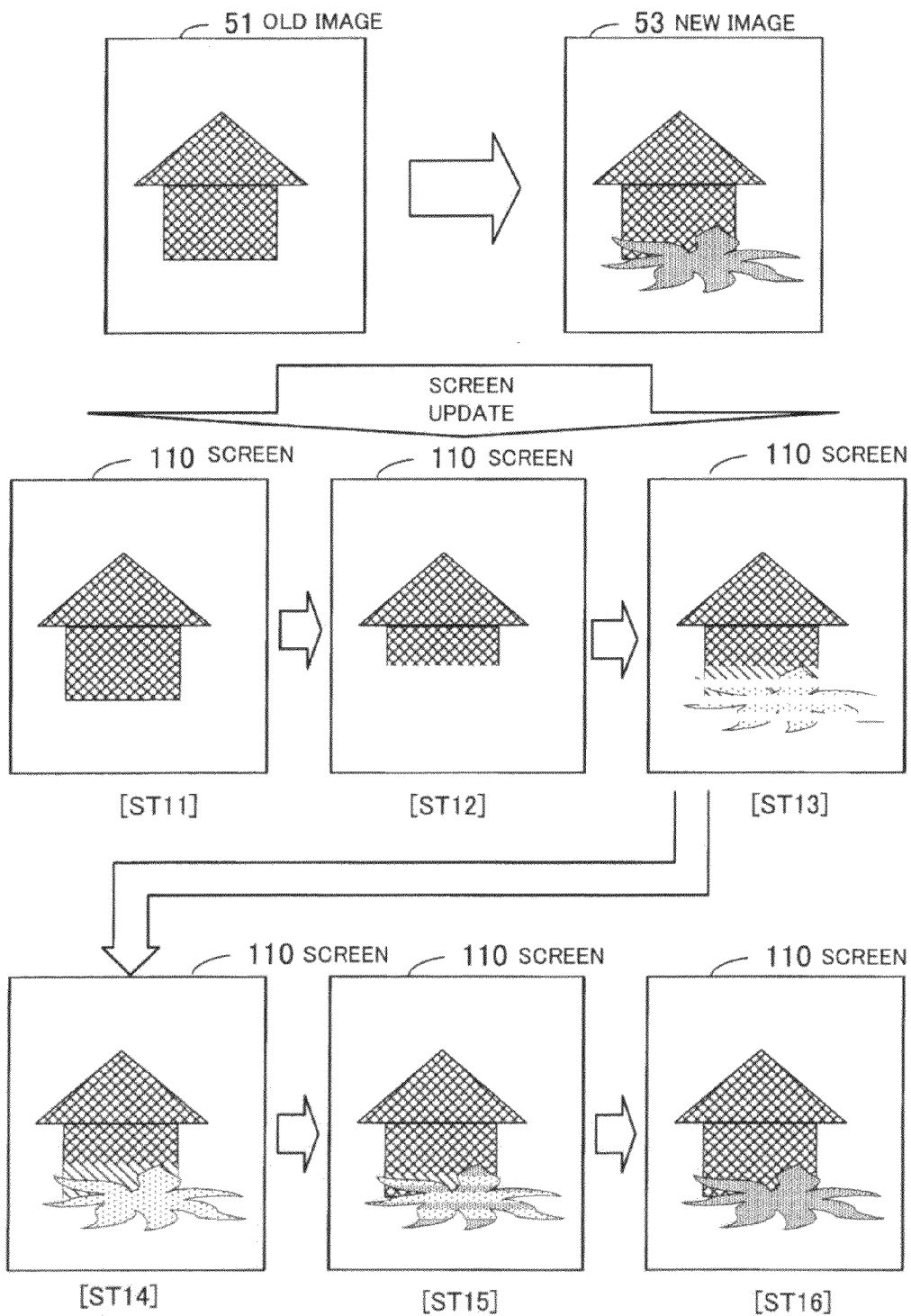
FIG. 19 illustrates a screen transition at the time of drawing an image with horizontal lines.
Figure 20:
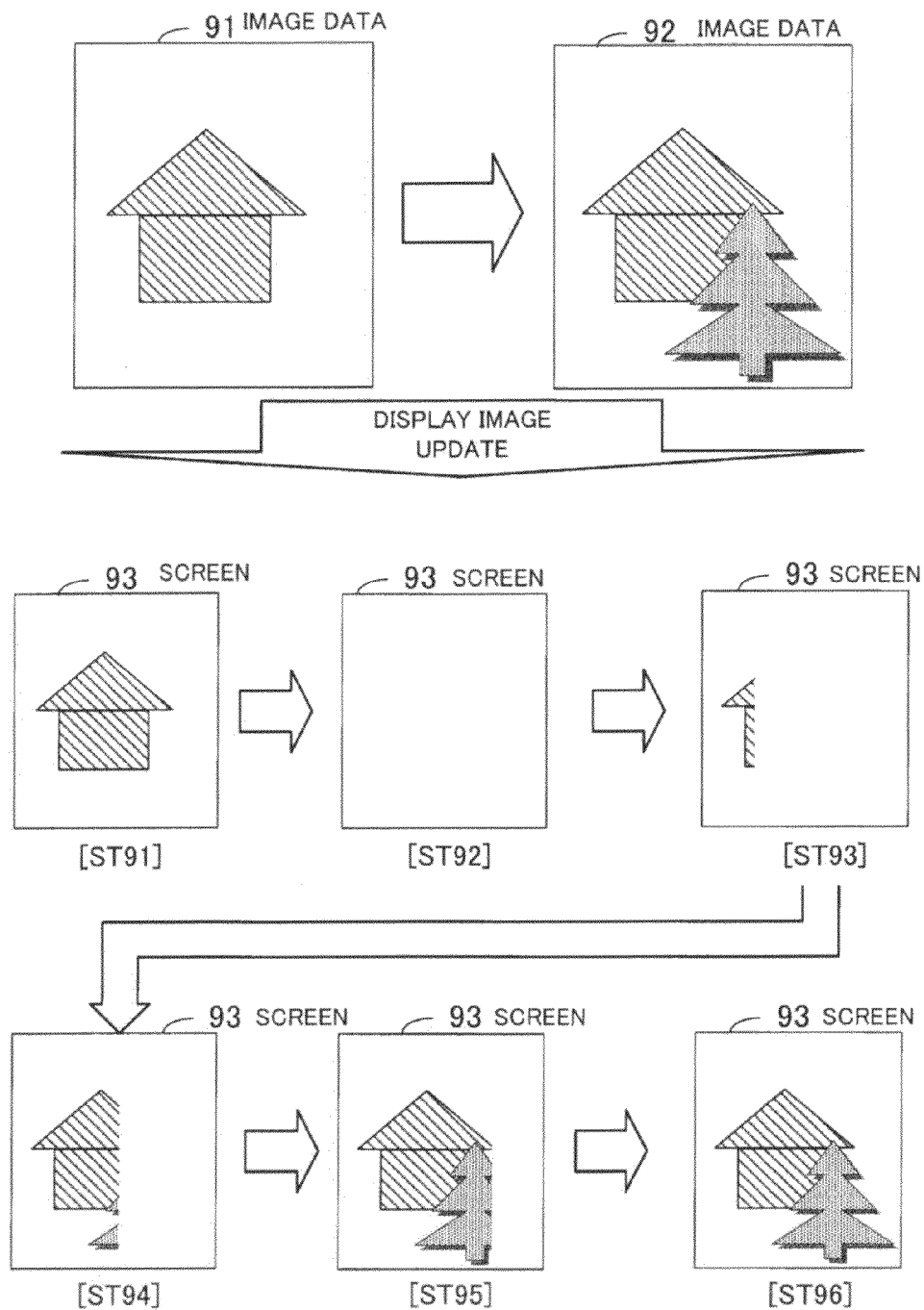
FIG. 20 illustrates a situation of an image update according to a conventional electronic paper terminal device.

FIG. 19 illustrates a screen transition at the time of drawing an image on the lines in the horizontal direction. In an example of FIG. 19, a pattern of a leaf, is added to the old image 51 on which a house is drawn and a new image 53 is generated. A graphic of the leaf illustrated in FIG. 19 is horizontally long. Therefore, the number of the lines is reduced in the image in which the image is redrawn on the lines in the horizontal direction. As a result, the image is redrawn on the lines in the horizontal direction.

An eleventh state (ST11) illustrates a screen 110 on which the old image 51 is displayed. When an instruction of the screen update is input in this state, only a portion to be redrawn is deleted. A twelfth state (ST12) illustrates the screen 110 after the deletion of a change part. In this example, the horizontal lines of a portion having drawn thereon the leaf are deleted.

Next, the image is drawn on the respective lines in descending order of the priorities of the lines. A thirteenth state (ST13) illustrates a state in which the image is drawn on about half of the lines. A fourteenth state (ST14) illustrates a state in which a first drawing operation is completed. A fifteenth state (ST15) illustrates a state in which about half of a second drawing operation is performed on the lines. A sixteenth state (ST16) illustrates a state in which two times of the drawing operations are completed on all the lines.

As can be seen from the above sequence, the image can be drawn on the respective lines in the drawing range in an appropriate order according to the image to be displayed. For example, in the case of drawing the character string as illustrated in FIG. 5, a ratio of the character string drawing API becomes high and a weight of the priorities on the basis of the concentration calculation method becomes large. As a result, even if an illustration except the character string is displayed in a corner of the screen, a portion of the character string is preferentially displayed. Further, in the case of a pop-up display of an error message as illustrated in FIG. 6, a ratio of the bitmap transfer API becomes high and a weight of the priorities on the basis of the adjacent pixel comparison method becomes large. As a result, the frame and the character portion are preferentially displayed. Further, in the case of highlighting the object selected by the operation input as illustrated in FIG. 7, the redrawing area ratio becomes small and a weight of the priorities on the basis of the new and old pixel comparison method becomes large. As a result, even if small changes such as a not-yet selected button and gray out (changes a character color into gray) of a character display color are performed, the priorities of objects to be highlighted in which a color of the whole button is changed become high. As a result, the selected objects are preferentially displayed.

The above-described processing function can be realized by a computer. In that case, there is provided a program having described therein processing contents of a function with which the video driver 123 should be provided. When the program is executed by a computer, the above-described processing function is realized by a computer. The program having described therein the processing contents can be recorded in a computer-readable recording medium. Examples of the computer-readable recording medium include a magnetic recording system, an optical disk, a magneto-optical recording medium, and a semiconductor memory. Examples of the magnetic recording system include a hard disk drive (HDD), a floppy disk (FD), and a magnetic tape. Examples of the optical disk include a DVD (digital versatile disc), a DVD-RAM, a CD-ROM (compact disc read only memory), and a CD-R (readable)/RW (rewritable). Examples of the magneto-optical recording medium include an MO (Magneto-Optical disk).

In case of distribution of programs, portable recording media, such as DVD and CD-ROM with the recorded programs are sold. Also, programs are stored in a storage device of a server computer, and the programs can be transferred to other computers from the server computer via a network.

The computer which executes the program stores, for example, a program recorded in a portable recording medium or a program transferred from the server computer in the storage device of the computer. The computer then reads out the program from the storage device of the computer, and executes processings according to the program. The computer may directly read out the program from the portable recording medium to execute the processings according to the program. The computer may also sequentially execute processings according to a received program every time the program is transferred from the server computer.

The proposed electronic paper terminal device permits an image to be drawn in descending order of the priorities of the lines according to the image to be displayed. Further, the electronic paper terminal device permits contents of the image to be displayed to be easily grasped even in the middle of the drawing operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. An electronic paper terminal device comprising:
   a display device capable of dividing a screen thereof into a plurality of lines of pixels and updating the screen on a line-by-line basis;
   an image storage unit which stores an image to be displayed on the display device;
   a pixel concentration calculation unit which calculates concentrations of pixels constituting the image to be displayed, and totalizes the concentrations of pixels for each line of the display device;
   a drawing order determination unit which determines priority of each line of the display device based on the totalized concentrations for each line;
   a priority storage unit which stores priorities of each of the lines determined by the drawing order determination unit; and
   a drawing unit which selects lines in descending order corresponding with the priorities stored in the priority storage unit, acquires image data on the selected lines from the image to be displayed, and draws on the selected lines of the display device based on the acquired image data.

2. The electronic paper terminal device according to claim 1,
   wherein the drawing order determination unit gives higher priority to lines with higher total values of the concentrations of pixels.

3. The electronic paper terminal device according to claim 1, comprising:
   an adjacent pixel comparison unit which calculates concentration differences between each of pixels configuring the screen and pixels adjacent to said each pixel, and totalizes the calculated concentration differences of pixels configuring said each line, for said each line,
   wherein the drawing order determination unit gives higher priority to lines with higher total values corresponding with the concentration differences.

4. The electronic paper terminal device according to claim 1, comprising:
   a new and old pixel comparison unit which calculates concentration differences between an old image before an update and the image to be displayed, for each of pixels configuring the screen, and totalizes the calculated concentration differences of pixels configuring said each line, for said each line,
   wherein the drawing order determination unit gives higher priority to lines having higher total values corresponding with the concentration differences.

5. The electronic paper terminal device according to claim 1, comprising:
   a pixel concentration calculation unit which calculates concentrations of each of pixels configuring the image to be displayed, totalizes the calculated concentrations of pixels configuring said each line, for said each line, and sets the total value for said each line as a concentration calculation result;
   an adjacent pixel comparison unit which calculates concentration differences between each of pixels configuring the screen and pixels adjacent to said each pixel, totalizes the calculated concentration differences of pixels configuring said each line, for said each line, and sets the total value for said each line as an adjacent pixel comparison result; and
   a new and old pixel comparison unit which calculates concentration differences between an old image before an update and the image to be displayed, for each of pixels configuring the screen, and totalizes the calculated concentration differences of pixels configuring said each line, for said each line, and sets the total value for said each line as a new and old pixel comparison result,
   wherein the drawing order determination unit totalizes the concentration calculation result, the adjacent pixel comparison result, and the new and old pixel comparison result for said each line, and gives higher priority to lines with higher total values.

6. The electronic paper terminal device according to claim 5,
   wherein the drawing order determination unit determines weights for the concentration calculation result, the adjacent pixel comparison result, and the new and old pixel comparison result, respectively, according to contents of the image to be displayed, and gives higher priority to lines with higher total values of the concentration calculation result, the adjacent pixel comparison result, and the new and old pixel comparison corrected result value adjusted by the respective weights.

7. The electronic paper terminal device according to claim 6, comprising:
   an update range determination unit which detects a difference portion between an image before a change and the image to be displayed, and sets the difference portion of the image to be displayed as an update range to be redrawn,
   wherein the drawing order determination unit determines weights for the concentration calculation result, the adjacent pixel comparison result, and the new and old pixel comparison result, respectively, according to a ratio of the update range occupied in the image to be displayed.

8. The electronic paper terminal device according to claim 7,
   wherein the drawing order determination unit gives higher weights to the concentration calculation result and the adjacent pixel comparison result, respectively, as the ratio of the occupied update range is higher.

9. The electronic paper terminal device according to claim 6,
   wherein the drawing order determination unit determines weights of the concentration calculation result, the adjacent pixel comparison result, and the new and old pixel comparison result, according to object drawing ratios of object types in drawing the image to be displayed.

10. The electronic paper terminal device according to claim 9,
    wherein the drawing order determination unit gives a higher weight to the concentration calculation result as an object drawing ratio of a character string is higher.

11. The electronic paper terminal device according to claim 9,
    wherein the drawing order determination unit gives a higher weight to the concentration calculation result as an object drawing ratio of a rectangle is higher.

12. The electronic paper terminal device according to claim 9,
    wherein the drawing order determination unit gives a higher weight to the adjacent pixel comparison result as a number of times of drawing bitmap data in the image to be displayed increases.

13. The electronic paper terminal device according to claim 1, wherein:

the plurality of lines includes horizontal lines lying in a horizontal direction and vertical lines lying in a vertical direction; and the drawing order determination unit determines the priority of each of a plurality of the horizontal lines and the vertical lines.

14. The electronic paper terminal device according to claim 13, comprising:

a drawing direction determination unit which detects a difference portion between an image before a change and the image to be displayed, sets the difference portion of the image to be displayed as an update range to be redrawn, compares the number of horizontal lines lying across the update range with the number of vertical lines lying across the update range, and determines a direction with a smaller number of lines, as a drawing direction of the update range, wherein the drawing unit acquires image data on the selected lines of the lines lying only in the determined direction, from the image to be displayed, and draws on the selected lines of the display device based on the acquired image data.

15. The electronic paper terminal device according to claim 14, wherein, when a plurality of the update ranges is present, the drawing direction determination unit obtains all combinations of two drawing direction candidates and the plurality of the update ranges, and calculates the number of lines lying in each of the two drawing direction candidates in each of the plurality of update ranges, calculates a line total of the calculated lines for each of the combinations, and detects a combination with a smallest line total to determine the drawing directions of the respective update ranges, the two drawing direction candidates representing drawing with the horizontal lines and drawing with the vertical lines.

16. The electronic paper terminal device according to claim 1, comprising:

an update range determination unit which detects a difference portion between an image before a change and the image to be displayed, sets the difference portion of the image to be displayed as an update range to be redrawn, wherein the drawing unit acquires image data on the selected lines of the lines lying across the update range determined by the update range determination unit, from the image to be displayed, and draws on the selected lines of the display device based on the acquired image data.

17. The electronic paper terminal device according to claim 16, wherein the drawing unit deletes images on the lines lying across the update range on the display device, then acquires image data on the selected lines from the image to be displayed, and draws on the selected lines of the display device based on the acquired image data.

18. A computer-readable, non-transitory medium storing an image display control program for causing a computer to execute a process, the process comprising:

dividing a screen of a display device into a plurality of lines of pixels and updating the screen on a line-by-line basis;

storing an image to be displayed on the display device;

calculating concentrations of pixels constituting the image to be displayed, and totalizing the concentrations of pixels for each line of the display device;

determining priority of each line of the display device based on the totalized concentrations for each line;

storing priorities of each line determined by the determining; and selecting lines in descending order corresponding with the stored priorities, acquiring image data on the selected lines from the image to be displayed, and drawing on the selected lines of the display device based on the acquired image data.

19. An image display control method comprising:

dividing a screen of a display device into a plurality of lines of pixels and updating the screen on a line-by-line basis;

analyzing an image to be displayed on the display device;

calculating concentrations of pixels constituting the image to be displayed, and totalizing the concentrations of pixels for each line of the display device;

determining priority of each line of the display device based on the totalized concentrations for each line;

storing priorities of each line determined in the determining; and selecting lines in descending order corresponding with the stored priorities, acquiring image data on the selected lines from the image to be displayed, and drawing on the selected lines of the display device based on the acquired image data.

* * * * *